United States Patent
Takayama et al.

(10) Patent No.: US 7,088,395 B2
(45) Date of Patent: Aug. 8, 2006

(54) IMAGE-CAPTURING APPARATUS

(75) Inventors: Jun Takayama, Tokyo (JP); Tetsufumi Takaba, Tokyo (JP); Kyosei Miyata, Tokyo (JP); Takao Hosaka, Tokyo (JP); Takenori Kitada, Tokyo (JP); Koichi Sato, Tokyo (JP); Hiroshi Kibayashi, Tokyo (JP)

(73) Assignee: Konica Corporation, Tokyo (JP)

( * ) Notice: Subject to any disclaimer, the term of this patent is extended or adjusted under 35 U.S.C. 154(b) by 816 days.

(21) Appl. No.: 10/052,706

(22) Filed: Jan. 17, 2002

(65) Prior Publication Data

US 2002/0101532 A1    Aug. 1, 2002

(30) Foreign Application Priority Data

Jan. 29, 2001  (JP) ............................. 2001-019503
Sep. 20, 2001  (JP) ............................. 2001-288585

(51) Int. Cl.
*H04N 3/14*     (2006.01)
*H04N 5/335*    (2006.01)
*H04N 5/222*    (2006.01)

(52) U.S. Cl. ................. 348/297; 348/308; 348/364
(58) Field of Classification Search ........ 348/296–297, 348/308, 362–364, 367
See application file for complete search history.

(56) References Cited

U.S. PATENT DOCUMENTS

| | | | | |
|---|---|---|---|---|
| 4,471,228 A | * | 9/1984 | Nishizawa et al. | 348/298 |
| 4,563,708 A | | 1/1986 | Ishibashi | |
| 4,573,077 A | | 2/1986 | Imai | |
| 4,638,365 A | * | 1/1987 | Kato | 348/229.1 |
| 4,881,127 A | * | 11/1989 | Isoguchi et al. | 348/293 |
| 4,939,579 A | * | 7/1990 | Nakamura | 348/297 |
| 4,963,985 A | * | 10/1990 | Isoguchi et al. | 348/348 |
| 5,331,166 A | | 7/1994 | Crosetto et al. | |
| 5,751,352 A | * | 5/1998 | Ogawa | 348/364 |
| 5,937,027 A | | 8/1999 | Thevenin et al. | |
| 6,195,127 B1 | * | 2/2001 | Sugimoto | 348/370 |
| 6,707,500 B1 | * | 3/2004 | Tamura et al. | 348/362 |
| 6,819,360 B1 | * | 11/2004 | Ide et al. | 348/340 |
| 6,829,008 B1 | * | 12/2004 | Saga et al. | 348/302 |

FOREIGN PATENT DOCUMENTS

| | | |
|---|---|---|
| EP | 0 981 245 A2 | 2/2000 |
| JP | 6-71323 | 9/1994 |
| JP | 6-87582 | 11/1994 |
| JP | 11-195778 | 7/1999 |

* cited by examiner

*Primary Examiner*—Ngoc-Yen Vu
*Assistant Examiner*—Carramah J. Quiett
(74) *Attorney, Agent, or Firm*—Frishauf, Holtz, Goodman & Chick, P.C.

(57) ABSTRACT

The invention concerns an image-capturing apparatus and an imager. The image-capturing apparatus includes the imager in which a plurality of circuit cells are two-dimensionally aligned, and an electronic charge, photo-electronically converted from a received light and stored in each circuit cell, can be discharged from an arbitral circuit cell. The imager includes first group circuit cells to generate electronic charges corresponding to the pixels of the image including a subject, and second group circuit cells to generate electronic charges corresponding to an amount of light coming from the subject, the electronic charges further being converted to a detected value. In the imager, at least one of two operations of halting a generating-action of the electronic charges in the first group circuit cells and discharging the electronic charges from the first group circuit cells is performed, when the detected value exceeds a threshold value.

10 Claims, 15 Drawing Sheets

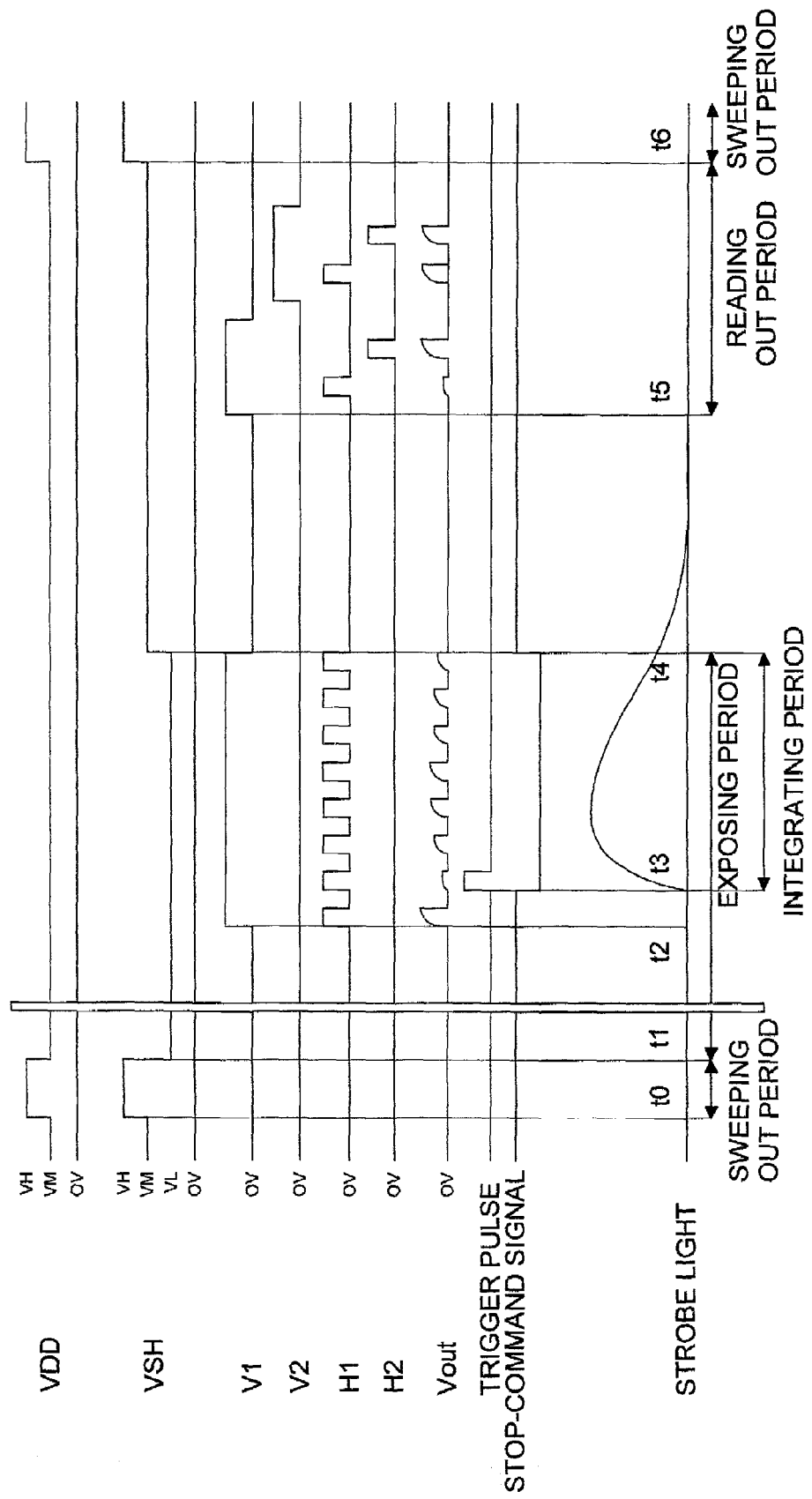

IMAGE-CAPTURING APPARATUS

BACKGROUND OF THE INVENTION

The present invention relates to an image-capturing apparatus and an imager, and specifically relates to an image-capturing apparatus, such as an electronic still camera, etc., in which an electronic shutter function and a light detecting function of the solid-state imager is utilized for controlling an exposure amount, and an imager employed for the image-capturing apparatus.

Thanks to the recent development of the electronic technology, electronic still cameras including digital still cameras, which can convert a photo-image to image data and can store the image data, have been developed and proliferated in the market. Incidentally, in the conventional electronic still cameras, a photometry conducted by the imager is commenced when the release switch is pushed to a half-stroke, and then, an image-capturing is conducted at a shutter speed and an aperture determined on the basis of the photometry result when the release switch is pushed to a full-stroke. Further, to cope with such a case that a sufficient reflected light cannot be returned from the subject when capturing images in a room or a night, the conventional electronic still cameras incorporate an automatic intensity-adjusting strobe.

In the automatic intensity-adjusting strobe having a photo-sensor, such as a photo-diode, etc., disposed in the vicinity of the strobe or the lens, the exposure amount is controlled in such a manner that the photo-sensor detects an amount of reflected light when the light emitted by the strobe is reflected from the subject and the light emitting action of the strobe is deactivated when the amount of reflected light reaches to an appropriate amount.

Incidentally, for instance, in the cameras set forth in Tokkouhei 6-87582 and Tokkouhei 6-71323, an amount of reflected strobe light is detected by an exclusive photo-sensor, while an exposure amount is controlled by an action of the electronic shutter in the imager, instead of the deactivation of the strobe light.

On the other hand, when capturing a scene in which the subject brightness is currently varying, there is a fear that a field brightness at the stage of pushing the release switch to a half-stroke is different from that at the stage of pushing the release switch to a full-stroke, resulting in an inappropriate exposure amount.

In some of cameras in which the release switch has not the half-stroke mode, both photometry and ranging are commenced at the time of operating the release switch, and immediately after completing the photometry and ranging, exposing operation is conducted. In this case, since a time lag is generated between the time of pushing the release switch and the time of exposing the scene, there is a fear that the scene actually photographed is different from the scene that the photographer really intended to capture, due to a change of the subject posture within the time lag, etc.

To overcome the abovementioned problem, a photometry element, which allows a camera to conduct a photometry operation during the photo-electronic conversion performed in the imager when pushing the release switch, has been separately equipped in the camera. In such the camera, the shutter speed can be set at either a fast or a slow mode corresponding to the change of the field brightness, resulting in an appropriate exposing operation. It has been a problem, however, that the photometry element separately equipped in the camera would raise the cost of electronic still camera and would make the size of the camera larger.

Further, there has been a well-known camera that repeatedly conducts photometry operations when the power switch is turned on, and captures an image in response to the pushing action of the release switch. According to such the camera, since the photometry operations are conducted before the pushing action of the release switch, it becomes possible to conduct a more appropriate exposing operation by, for instance, finding an average value of the brightness, even if the field brightness of the scene would vary during the image-capturing operation. Such the camera, however, is apt to consume a large amount of electronic power since photometry operations are successively performed after the release switch is pushed, and as a result, a number of captured images is limited to a relatively small number when a battery is employed as a power source.

On the other hand, during the time period from a time when the power switch is turned on to a time when the power switch is turned off, a power dissipation is continues due to a faint electronic current flowing into the electronic circuit of the camera. To suppress such the unnecessary power dissipation, there has been developed a camera, in which the power-supplying operation is automatically deactivated in case that the release switch has not been pushed during a predetermined time-interval after the power switch was turned on. Even such the camera, however, surely consumes electronic power during the predetermined time-interval after the power switch was turned on. Accordingly, there has been desired to develop a configuration of a camera that can suppress the power consumption mentioned above.

Incidentally, in order to incorporate the automatic intensity-adjusting strobe in the camera, it is necessary to dispose the photo-sensor at a front side of the electronic still camera other than the light-emitting section of strobe light. Accordingly, it has been a problem that a space for disposing the photo-sensor should be located at an appropriate position. Specifically, since promoting the minimization of the product and the priority of good design have tended to be a mainstream of the design concept, it has been increasingly become difficult to find the appropriate position for mounting even a very small part. In addition, other than the photo-sensor, it is necessary to employ a semiconductor element for shorting a voltage applied to a strobe-light emitting tube so as to stop emitting the strobe light. Such the semiconductor element would raise the cost of the product.

Further, in case that the exposure-controlling operation is performed in the solid-state imager by employing the technologies set forth in the aforementioned official gazettes, although the semiconductor element for stopping the emission of the strobe light can be excluded, at least the photo-sensor is still required. Accordingly, aforementioned problems in regard to the space and the cost could not be solved.

Still further, when the photo-sensor is employed, sometimes, the actual image-capturing range deviates from the detecting range of the strobe light, since an angle of incidence or a direction of incidence varies depending on variations of mounting accuracy. Accordingly, it has been a problem that an accurate adjustment of the strobe light becomes difficult, or requires laborious adjusting operations.

SUMMARY OF THE INVENTION

To overcome the abovementioned drawbacks in conventional image-capturing apparatus, the first object of the present invention is to provide an image-capturing apparatus, which makes it possible to reduce its power consumption at a low level and to perform an appropriate exposing operation.

Further, the second object of the present invention is to provide an image-capturing apparatus and an imager employed for it, which is low-cost, flexible in outlook designing and possible to accurately adjust the light amount by reducing a number of necessary parts and man-hours for adjustments.

Accordingly, to overcome the cited shortcomings, the abovementioned objects of the present invention can be attained by image-capturing apparatus and imagers described as follow.

(1) An apparatus for capturing an image, comprising: a first photoelectronic converting element to capture the image; a second photoelectronic converting element to measure an amount of light for a purpose of a photometry operation; and a signal outputting device to output an image-capturing start signal; wherein a first photoelectronic converting action performed by the first photoelectronic converting element and a second photoelectronic converting action performed by the second photoelectronic converting element are commenced in response to the image-capturing start signal, and, when a signal value obtained as a result of the second photoelectronic converting action performed by the second photoelectronic converting element reaches to a predetermined value, the first photoelectronic converting action performed by the first photoelectronic converting element is finalized.

(2) The apparatus of item 1, wherein the signal outputting device is a release switch.

(3) An apparatus for capturing an image, comprising: a first photoelectronic converting element to capture the image; a second photoelectronic converting element to measure an amount of light for a purpose of a photometry operation; and a power switch to turn ON supplying an electronic power to a circuit in the apparatus; wherein a first photoelectronic converting action performed by the first photoelectronic converting element and a second photoelectronic converting action performed by the second photoelectronic converting element are commenced when the power switch is turned ON.

(4) The apparatus of item 3, wherein, when a signal value obtained as a result of the second photoelectronic converting action performed by the second photoelectronic converting element reaches to a predetermined value, the first photoelectronic converting action performed by the first photoelectronic converting element is finalized.

(5) The apparatus of item 1, further comprising: a warning section to issue a warning, in case that the signal value does not reach to the predetermined value when a predetermined time has elapsed since the first photoelectronic converting action was commenced.

(6) The apparatus of item 1, wherein, in case that the signal value does not reach to the predetermined value when a predetermined time has elapsed since the first photoelectronic converting action was commenced, the first photoelectronic converting action performed by the first photoelectronic converting element is finalized.

(7). The apparatus of item 1, wherein, in case that the signal value does not reach to the predetermined value when a predetermined time has elapsed since the first photoelectronic converting action was commenced, the first photoelectronic converting action performed by the first photoelectronic converting element is continued in response to a predetermined operation.

(8) The apparatus of item 7, further comprising: a mode selecting device to select either a first mode in which the first photoelectronic converting action performed by the first photoelectronic converting element is continued in response to the predetermined operation, or a second mode in which the first photoelectronic converting element performs an action other than continuing the first photoelectronic converting action in response to the predetermined operation.

(9) The apparatus of item 7, wherein, the predetermined operation is to operate a release switch.

(10) The apparatus of item 1, further comprising: an aperture device, disposed between a subject and the first photoelectronic converting element, to vary a diameter of an aperture opening; wherein, in case that the signal value does not reach to the predetermined value when a predetermined time has elapsed since the first photoelectronic converting action was commenced, the aperture device increases the diameter of the aperture opening.

(11) The apparatus of item 10, wherein the aperture device varies the diameter of the aperture opening in a non-step mode.

(12) The apparatus of item 10, wherein the aperture device varies the diameter of the aperture opening in a stepwise mode.

(13) An apparatus for capturing an image including a subject, comprising: a photographic lens; a light emitting device to illuminate the subject; and an imager in which a plurality of circuit cells are two-dimensionally aligned, each of the plurality of circuit cells corresponding to each of pixels of the image, and which is so constituted that an electronic charge, photo-electronically converted from a received light and stored in each of the plurality of circuit cells, can be discharged from an arbitral circuit cell, without waiting for its turn in a sequential discharging order of other circuit cells; wherein the imager comprises: first group circuit cells to generate electronic charges corresponding to the pixels of the image including the subject, the electronic charges further being converted to image data; and second group circuit cells to generate electronic charges corresponding to an amount of light coming from the subject, the electronic charges further being converted to a detected value; and wherein a light emitting action of the light emitting device is instantaneously halted, when the detected value exceeds a threshold value.

(14) An apparatus for capturing an image including a subject, comprising: a photographic lens; and an imager in which a plurality of circuit cells are two-dimensionally aligned, each of the plurality of circuit cells corresponding to each of pixels of the image, and which is so constituted that an electronic charge, photo-electronically converted from a received light and stored in each of the plurality of circuit cells, can be discharged from an arbitral circuit cell, without waiting for its turn in a sequential discharging order of other circuit cells; wherein the imager comprises: first group circuit cells to generate electronic charges corresponding to the pixels of the image including the subject, the electronic charges further being converted to image data; and second group circuit cells to generate electronic charges corresponding to an amount of light coming from the subject, the electronic charges further being converted to a detected value; and wherein at least one of two operations of halting a generating-action of the electronic charges in the first group circuit cells and discharging the electronic charges from the first group circuit cells is performed, when the detected value exceeds a threshold value.

(15) The apparatus of item 13, wherein the imager is so constituted that the electronic charge can be discharged from a specific circuit cell in response to a specific trigger signal.

(16) The apparatus of item 13, wherein the second group circuit cells are a part of the first group circuit cells or are mingled with the first group circuit cells.

(17) The apparatus of item 16, wherein second image data, corresponding to a position of a second group circuit cell, can be obtained, based on first image data obtained from first group circuit cells located at a periphery of the second group circuit cell.

(18) The apparatus of item 13, wherein the imager further comprises: a detecting section to detect whether or not the detected value exceeds the threshold value.

(19) The apparatus of item 13, wherein the imager further comprises: an outputting port to output the electronic charges, stored in the second group circuit cells, to an external section.

(20) The apparatus of item 13, wherein, in case that the imager comprises three or more circuit cells serving as the second group circuit cells, when a value of a electronic charge stored in one of the circuit cells is greater than an averaging value of electronic charges stored in other circuit cells by a predetermined value, the detected value is derived from electronic charges stored in the other circuit cells by excluding the electronic charge stored in the one of the circuit cells, to compare the detected value with the threshold value.

(21) The apparatus of item 13, wherein the electronic charges stored in the second group circuit cells are simultaneously discharged.

(22) The apparatus of item 13, wherein the electronic charges stored in the second group circuit cells are discharged in response to clock signals.

(23) The apparatus of item 13, wherein the imager is so constituted that each amount of the electronic charges stored in the second group circuit cells can be detected without discharging them.

(24) The apparatus of item 13, wherein trigger signals are sequentially applied one by one to each of the second group circuit cells, so as to discharge each of the electronic charges, stored in the second group circuit cells, in an order of applying the trigger signals.

(25) The apparatus of item 13, wherein each of the second group circuit cells includes at least two charge-storing sections.

(26) The apparatus of item 13, wherein the second group circuit cells are disposed near a center of an image-capturing area of the imager.

(27) The apparatus of item 13, wherein the electronic charges stored in the second group circuit cells are sequentially discharged one by one in such a manner that circuit cells located near a center of an image-capturing area of the imager are firstly discharged.

(28) An imager that is employed for an apparatus for capturing an image including a subject, the apparatus incorporating a light emitting device to illuminate the subject, and the imager in which a plurality of circuit cells are two-dimensionally aligned, each of the plurality of circuit cells corresponding to each of pixels of the image, and which is so constituted that an electronic charge, photo-electronically converted from a received light and stored in each of the plurality of circuit cells, can be discharged from an arbitral circuit cell, without waiting for its turn in a sequential discharging order of other circuit cells, comprising; first group circuit cells to generate electronic charges corresponding to the pixels of the image including the subject, the electronic charges further being converted to image data; and second group circuit cells to generate electronic charges corresponding to an amount of light coming from the subject, the electronic charges further being converted to a detected value; wherein a light emitting action of the light emitting device is instantaneously halted, when the detected value exceeds a threshold value.

(29) An imager in which a plurality of circuit cells are two-dimensionally aligned, each of the plurality of circuit cells corresponding to each of pixels of an image to be captured, and which is so constituted that an electronic charge, photo-electronically converted from a received light and stored in each of the plurality of circuit cells, can be discharged from an arbitral circuit cell, without waiting for its turn in a sequential discharging order of other circuit cells, comprising; first group circuit cells to generate electronic charges corresponding to the pixels of the image including a subject, the electronic charges further being converted to image data; and second group circuit cells to generate electronic charges corresponding to an amount of light coming from the subject, the electronic charges further being converted to a detected value; and wherein at least one of two operations of halting a generating-action of the electronic charges in the first group circuit cells and discharging the electronic charges from the first group circuit cells is performed, when the detected value exceeds a threshold value.

(30) The imager of item 28, wherein the electronic charge can be discharged from a specific circuit cell in response to a specific trigger signal.

(31) The imager of item 28, wherein the second group circuit cells are a part of the first group circuit cells or are mingled with the first group circuit cells.

(32) The imager of item 31, wherein second image data, corresponding to a position of a second group circuit cell, can be obtained, based on first image data obtained from first group circuit cells located at a periphery of the second group circuit cell.

(33) The imager of item 28, further comprising: a detecting section to detect whether or not the detected value exceeds the threshold value.

(34) The imager of item 28, further comprising: an outputting port to output the electronic charges, stored in the second group circuit cells, to an external section.

(35) The imager of item 28, wherein, in case that the imager comprises three or more circuit cells serving as the second group circuit cells, when a value of a electronic charge stored in one of the circuit cells is greater than an averaging value of electronic charges stored in other circuit cells by a predetermined value, the detected value is derived from electronic charges stored in the other circuit cells by excluding the electronic charge stored in the one of the circuit cells, to compare the detected value with the threshold value.

(36) The imager of item 28, wherein the electronic charges stored in the second group circuit cells are simultaneously discharged.

(37) The imager of item 28, wherein the electronic charges stored in the second group circuit cells are discharged in response to clock signals.

(38) The imager of item 28, wherein each amount of the electronic charges stored in the second group circuit cells can be detected without discharging them.

(39) The imager of item 28, wherein trigger signals are sequentially applied one by one to each of the second group circuit cells, so as to discharge each of the electronic charges, stored in the second group circuit cells, in an order of applying the trigger signals.

(40) The imager of item 28, wherein each of the second group circuit cells includes at least two charge-storing sections.

(41) The imager of item 28, wherein the second group circuit cells are disposed near a center of an image-capturing area of the imager.

(42) The imager of item 28, wherein the electronic charges stored in the second group circuit cells are sequentially discharged one by one in such a manner that circuit cells located near a center of an image-capturing area of the imager are firstly discharged.

(43) An imager, comprising: a plurality of circuit cells two-dimensionally aligned in an image-capturing area, each of the plurality of circuit cells corresponding to each of pixels of an image to be captured; and a plurality of photo-sensing elements disposed between the plurality of circuit cells; wherein the plurality of photo-sensing elements are arranged in a line with spaces each of which is equivalent to a distance between more than two circuit cells included in the plurality of circuit cells.

(44) A device for capturing an image including a subject, comprising: an image-capturing section in which a plurality of circuit cells are two-dimensionally aligned, each of the plurality of circuit cells corresponding to each of pixels of the image to be captured; a photographic lens to focus the image onto the image-capturing section; a photo-sensing element disposed outside the image-capturing section; and an optical system to guide a part of light, reflected from the subject and coming from the photographic lens to the image-capturing section, to the photo-sensing element.

(45) An apparatus for capturing an image including a subject, comprising: a photographic lens; a color filter; and an imager, in which first group circuit cells to capture the image, and second group circuit cells to obtain photometry data, are two-dimensionally aligned, each of the first group circuit cells and the second group circuit cells corresponding to each of pixels of the image; wherein a light coming from the subject is received by the first group circuit cells after passing through the color filter, while the light coming from the subject is received by the second group circuit cells without passing through the color filter.

(46) An apparatus for capturing an image including a subject, comprising: a photographic lens; an imager in which a plurality of circuit cells are two-dimensionally aligned, each of the plurality of circuit cells corresponding to each of pixels of the image; wherein the imager comprises: first group circuit cells to capture the image; second group circuit cells to obtain photometry data; and color filters, each of which corresponds to one of primary colors for reproducing a color image, to cover each of the first group circuit cells so as to generate image data sets corresponding to the primary colors; and wherein none of the second group circuit cells are covered by the color filters, and each of the second group circuit cells is disposed at such a position that it is surrounded by the first group circuit cells without aligning side by side in any directions.

(47) An apparatus for capturing an image including a subject, comprising: a photographic lens; an imager, in which first group circuit cells to capture the image, and second group circuit cells to obtain photometry data, are two-dimensionally aligned, each of the first group circuit cells and the second group circuit cells corresponding to each of pixels of the image; and color filters, each of which corresponds to one of three primary colors for reproducing a color image, to cover both the first group circuit cells and the second group circuit cells; wherein the second group circuit cells include first-color circuit cells that receives light coming from the subject through a first-color filter of the color filters, second-color circuit cells that receives light coming from the subject through a second-color filter of the color filters and third-color circuit cells that receives light coming from the subject through a third-color filter of the color filters, and photometry data is obtained on the basis of output values of the first-color circuit cells, the second-color circuit cells and the third-color circuit cells.

(48) The apparatus of item 47, wherein the output values of the first-color circuit cells, the second-color circuit cells and the third-color circuit cells are weighted in a process of obtaining the photometry data.

(49) The apparatus of item 47, wherein the color filters are red, green and blue filters, respectively.

(50) The apparatus of item 1, wherein the first photoelectronic converting action performed by the first photoelectronic converting element and the second photoelectronic converting action performed by the second photoelectronic converting element are simultaneously commenced in response to the image-capturing start signal.

(51) The apparatus of item 3, wherein the first photoelectronic converting action performed by the first photoelectronic converting element and the second photoelectronic converting action performed by the second photoelectronic converting element are simultaneously commenced when the power switch is turned ON.

Further, to overcome the abovementioned problems, other image-capturing apparatus and imagers, embodied in the present invention, will be described as follow:

(52) An image-capturing apparatus, comprising:
a first photoelectronic converting element utilized for image-capturing;
a second photoelectronic converting element utilized for a photometry operation; and
a signal outputting means to output an image-capturing start signal;
characterized in that, in response to the image-capturing start signal outputted by the signal outputting means the first photoelectronic converting element and the second photoelectronic converting element simultaneously commences photoelectronic converting actions and, when a signal value obtained by the second photoelectronic converting action performed by the second photoelectronic converting element reaches to a predetermined value, the photoelectronic converting action performed by the first photoelectronic converting element is finalized.

According to the image-capturing apparatus described in item 52, since the second photoelectronic converting element can detect an amount of the light corresponding to that received by the first photoelectronic converting element even when capturing an image in which field brightness is currently varying, it becomes possible to perform an exposing operation more appropriately than ever. Further, since no photometry operation to be performed by the second photoelectronic converting element before the signal outputting means outputs the image-capturing start signal is necessary, it becomes possible to reduce power consumption by suppressing the operating time of the circuit elements within a short time.

Still further, it is desirable that the signal outputting means is a release switch.

(53) An image-capturing apparatus, comprising:

a first photoelectronic converting element utilized for image-capturing;

a second photoelectronic converting element utilized for a photometry operation; and a power switch;

characterized in that, in response to an operation for turning ON the power switch, the first photoelectronic converting element and the second photoelectronic converting element commence photoelectronic converting actions.

According to the image-capturing apparatus described in item 53, it becomes possible to save electronic power, which has been consumed during the time interval from the time of turning ON the power switch to the time of turning ON the release switch in conventional cameras. Incidentally, in the image-capturing apparatus embodied in the present invention, since the operation of the second photoelectronic converting element is performed in parallel with the operation of the first photoelectronic converting element after turning ON the power switch, no photometry operation should be conducted before the operation of the first photoelectronic converting element is commenced, resulting in an appropriate exposing operation while suppressing its power consumption.

Further, an appropriate exposing operation can be performed by finalizing the photoelectronic converting action of the first photoelectronic converting element, when a signal value obtained by photoelectronic converting action of the second photoelectronic converting element reaches to a predetermined value.

Still further, in case that image-capturing apparatus incorporates warning means for issuing a warning when the signal value does not reach to the predetermined value even if a predetermined time has elapsed since the first photoelectronic converting action was commenced, the photographer can easily recognize that hand-shake blurring caused by long exposing time is liable to occur in the present situation and can take appropriate countermeasures, such as a re-shooting of the image, etc.

Still further, by finalizing the photoelectronic converting action of the first photoelectronic converting element when a signal value obtained by photoelectronic converting action of the second photoelectronic converting element does not reach to a predetermined value even if a predetermined time has elapsed since the first photoelectronic converting action was commenced, it becomes possible to prevent the image-capturing apparatus from capturing an inappropriate image due to an underexposure condition, and from storing useless images in the memory.

Still further, by continuing the photoelectronic converting action of the first photoelectronic converting element in response to a predetermined operation when the signal value, obtained by the photoelectronic converting action of the second photoelectronic converting element, does not reach to the predetermined value even when a predetermined time has elapsed since the first photoelectronic converting action was commenced, it becomes possible to capture an image at night by using, for instance, a bulb mode.

Still further, since it becomes possible for photographer to use each of predetermined operations in its suitable way, it is desirable that the image-capturing apparatus further comprises mode selecting means for selecting either a first mode in which the photoelectronic converting action of the first photoelectronic converting element is continued in response to the predetermined operation, or a second mode in which the first photoelectronic converting element performs an action other than continuing the photoelectronic converting action in response to the predetermined operation.

Incidentally, it is desirable that the predetermined operation is to operate a release switch.

Still further, it is desirable that the image-capturing apparatus further comprises aperture means, disposed between the subject and the first photoelectronic converting element, for varying a diameter of an aperture opening. In such the image-capturing apparatus, by increasing the diameter of the aperture opening when the signal value, obtained by the photoelectronic converting action of the second photoelectronic converting element, does not reach to the predetermined value even when a predetermined time has elapsed since the first photoelectronic converting action was commenced, it becomes possible to compensate an underexposure condition and to prevent a hand-shake blurring, resulting in an optimum image-capturing operation.

Still further, in order to simplify the configuration of the image-capturing apparatus, it is desirable that the aperture means varies the diameter of the aperture opening in a non-step mode. It becomes possible, however, to control an exposure amount more finely than ever, when the aperture means varies the diameter of the aperture opening in a stepwise mode.

(54) An image-capturing apparatus for capturing a subject, characterized in that, in the image-capturing apparatus that comprises a light emitting device to illuminate the subject and an imager in which a plurality of circuit cells are two-dimensionally aligned, the imager is so constituted that an electronic charge can be discharged from an arbitral circuit cell, without waiting for discharging electronic charges from other circuit cells, and first group circuit cells of the imager is utilized for converting the subject image to image data while second group circuit cells of the imager is utilized for detecting an amount of light reflected from the subject, and in response to a fact that the electronic charge stored in the second group circuit cells exceeds a threshold value, the finalization of the light emitting action of the light emitting device is conducted.

(55) An image-capturing apparatus for capturing a subject, characterized in that, in the image-capturing apparatus that comprises an imager in which a plurality of circuit cells are two-dimensionally aligned, the imager is so constituted that an electronic charge can be discharged from an arbitral circuit cell, without waiting for discharging electronic charges from other circuit cells, and first group circuit cells of the imager is utilized for converting the subject image to image data while second group circuit cells of the imager is utilized for detecting an amount of light reflected from the subject, and in response to a fact that the electronic charge stored in the second group circuit cells exceeds a threshold value, at least one of two operations of halting a storing-action of the electronic charges in the first group circuit cells and discharging the electronic charges stored in the first group circuit cells is conducted.

(56) An imager utilized for an image-capturing apparatus, which comprises a light emitting device to illuminate a subject, characterized in that, the imager, in which a plurality of circuit cells are two-dimensionally aligned, is so constituted that an electronic charge can be discharged from an arbitral circuit cell, without waiting for discharging electronic charges from other circuit cells, and first group circuit cells of the imager is utilized for converting the subject image to image data while second group circuit cells of the imager is utilized for detecting an amount of light reflected from the subject, and in response to a fact that the electronic charge stored in the second group circuit cells exceeds a threshold value, the finalization of the light emitting action of the light emitting device is conducted.

(57) An imager utilized for an image-capturing apparatus, characterized in that, the imager, in which a plurality of circuit cells are two-dimensionally aligned, is so constituted that an electronic charge can be discharged from an arbitral circuit cell, without waiting for discharging electronic charges from other circuit cells, and first group circuit cells of the imager is utilized for converting the subject image to image data while second group circuit cells of the imager is utilized for detecting an amount of light reflected from the subject, and in response to a fact that the electronic charge stored in the second group circuit cells exceeds a threshold value, at least one of two operations of halting a storing-action of the electronic charges in the first group circuit cells and discharging the electronic charges stored in the first group circuit cells is conducted.

(58) An imager, comprising:

a plurality of circuit cells two-dimensionally aligned; and a plurality of photo-sensing elements disposed between the plurality of circuit cells; characterized in that, the plurality of photo-sensing elements are arranged in a line over more than two circuit cells.

(59) An image-capturing apparatus, characterized by comprising:

an image-capturing section in which a plurality of circuit cells are two-dimensionally aligned;

a photographic lens to focus a subject image onto the image-capturing section;

a photo-sensing element disposed outside the image-capturing section; and an optical system to guide a part of light, reflected from the subject and coming from the photographic lens to the image-capturing section, to the photo-sensing element.

According to the image-capturing apparatus described in item 54 or item 55, it becomes possible to control the light emitting action of the light emitting device, without employing any exclusive photo-sensing element and the optical system for it, which have been required in the conventional image-capturing apparatus, resulting in minimization, wider design flexibility, and cost-reduction of image-capturing apparatus. Incidentally, although an example of the imager, which is so constituted that an electronic charge can be discharged from an arbitral circuit cell, without waiting for discharging electronic charges from other circuit cells, would be, for instance, a CMOS imager, the scope of the imager mentioned above is not limited to the CMOS imager.

It is desirable that the imager is so constituted that the electronic charge can be discharged from a specific circuit cell in response to a specific trigger signal.

It is possible to maintain the quality of the image obtained by image-capturing operation at a high level, when the second image data, corresponding to a position of a second group circuit cell, can be obtained, based on first image data obtained from first group circuit cells located at a periphery of the second group circuit cell.

It becomes possible to form the image having a higher quality than ever, when the second group circuit cells are a part of the first group circuit cells or are mingled with the first group circuit cells, namely, the image data can be also obtained from the second group circuit cells.

Further, provided that the imager comprises a detecting section to detect whether or not the detected value exceeds the threshold value, the design flexibility can be improved, since the peripheral circuits for the imager can be integrated in a one-chip IC. For this imager, it is desirable that the threshold value can be inputted from the outside of the imager.

Still further, it is desirable that the imager further comprises an outputting port to output the electronic charges, stored in the second group circuit cells, to an external section.

Still further, in case that the imager comprises three or more circuit cells serving as the second group circuit cells, when a value of a electronic charge stored in one of the circuit cells is greater than an averaging value of electronic charges stored in other circuit cells by a predetermined value, it is desirable that the detected value is derived from electronic charges stored in the other circuit cells by excluding the electronic charge stored in the one of the circuit cells, to compare the detected value with the threshold value. According to the above configuration, since the exposure controlling operation can be conducted by excluding image data of highly bright subject, such as a headlamp emitting a high intensity light beam, it becomes possible to perform an accurate exposure controlling operation higher than ever.

Still further, it is desirable that the electronic charges stored in the second group circuit cells are simultaneously discharged. According to this configuration, it becomes possible to speedily conduct the exposure controlling operation and to simplify the controlling process.

Still further, it is desirable that the electronic charges stored in the second group circuit cells are discharged in response to clock signals. According to this configuration, it becomes possible to reduce the wirings for outputting the image signals, resulting in a cost-reduction.

Still further, it is desirable that the imager is so constituted that each amount of the electronic charges stored in the second group circuit cells can be detected without discharging them. According to this configuration, it becomes possible to detect the brightness of the subject at a real time.

Still further, provided that trigger signals are sequentially applied one by one to each of the second group circuit cells, so as to discharge each of the electronic charges, stored in the second group circuit cells, in an order of applying the trigger signals, it becomes possible to discharge each of the electronic charges in an arbitral order.

Still further, it is desirable that each of the second group circuit cells includes at least two charge-storing sections to separately store, for instance, an electronic charge for the image data in one of them before emitting the strobe light, and another electronic charge for the other image data in another one of them after emitting the strobe light.

Still further, it is desirable that the second group circuit cells are disposed near a center of an image-capturing area of the imager. According to this configuration, it becomes possible to conduct an appropriate exposure controlling operation for the main subject, which is liable to be located at the center of the image.

Still further, provided that the electronic charges stored in the second group circuit cells are sequentially discharged one by one in such a manner that circuit cells located near a center of an image-capturing area of the imager are firstly discharged, it becomes possible to speedily conduct an exposure controlling operation for the main subject, which is liable to be located at the center of the image.

According to the imager described in item 56 or item 57, it becomes possible to control the light emitting action of the light emitting device, without employing any exclusive photo-sensing element and the optical system for it, which have been required in the conventional image-capturing apparatus, resulting in minimization, wider design flexibility, and cost-reduction of image-capturing apparatus.

According to the imager described in item 58, it becomes possible to shorten a length of wiring for reading out the signals from the photo-sensing elements, resulting in a simplification of the configuration.

According to the imager described in item 58, since the photographic lens can be utilized for focusing the light onto both the image-capturing section and the photo-sensing element disposed outside the image-capturing section, it becomes possible to simplify the configuration and to improve flexibility for designing the image-capturing apparatus. Incidentally, the photo-sensing element would be a photodiode or a phototransistor, or could be a collected group of the circuit cells.

Incidentally, in the imager embodied in the present invention, two methods of reading out the image signals can be considered. Concretely speaking, one method is to leave the electronic charges, stored in the second group circuit cells, discharging, namely, leave them in ON state (a discharging state), and another method is to access the electronic charges in a high rate. When a plurality of circuit cells are included in the second group circuit cells, it is desirable that the circuit cells are scanned while switching them at a high rate. This is detected at one or several positions. For instance, when the strobe light is emitted, a short time output variation immediately after emitting the strobe light is observed by detecting the electronic charges stored in the second group circuit cells, so as to output a signal for stopping the emitting action of the strobe light when the detected value exceeds a certain threshold value. If the second group circuit cells are utilized for controlling the exposure amount, it is possible to compensate each of them with the first group circuit cells located around each of them as well as the defected circuit cells.

Other than utilizing a part of the circuit cells two-dimensionally aligned, it would be also applicable that the second group circuit cells exclusively used for obtaining exposure controlling data are equipped in the image-capturing section. For instance, when photo-sensing elements are disposed between the circuit cells, there arises a problem that an area for wirings increases, etc. It would be possible that circuit cells or photo-sensing elements are disposed around a circumferential area of the image-capturing section. Further, it may be possible that photo-sensing elements aligned in a line are equipped, instead of an independent circuit cell. Further, it may be also possible to divide the electronic charges stored in the second group circuit cells into exposure controlling data and image data. In this case, although the output amplitude of the circuit cells is smaller than that of the circuit cells for reading out the image data, there is an advantage that the quality deterioration of the image, formed by the amplified output signals, is smaller than that, formed by interpolating them with the signals read out from the peripheral circuit cells.

Further, provided that each of the circuit cells has a structure for nondestructive reading out operation (namely, the amount of the electronic charge can be read out without discharging the electronic charge from each of the circuit cells), it is possible to utilize the electronic charge stored in the second group circuit cells, for obtaining exposure controlling data, as the image data. In this case, it is desirable that, for instance, the data read out before emitting the strobe light are compared with the data read out after emitting the strobe light, and when exceeding the light adjusting level established in advance, the exposing operation is finalized.

Still further, when a part of the first group circuit cells is utilized as the second group circuit cells, there are two methods, namely, one method is to utilize a specific part of the first group circuit cells as fixed circuit cells, while another method is to utilize selected circuit cells, which are arbitrarily selected out of the first group circuit cells, as adaptively selected circuit cells. When employing the fixed circuit cells or exclusive employing the second group circuit cells, it is possible not to cover them with color filters, or it is possible to cover them with filters appropriate for the strobe light, etc. With respect to the imager employing the R-G-B color filters to cover each of the circuit cells, a spectrum sensitivity characteristic as the photo-sensing elements can be maintained by selecting the photo-sensing elements out of the circuit cells covered with the R-G-B color filters at a certain predetermined ratio. In this case, the spectrum sensitivity characteristic of the photo-sensing elements can be also varied by changing the ratio of the R-G-B color filters, which covers the circuit cells selected as the photo-sensing elements.

BRIEF DESCRIPTION OF THE DRAWINGS

Other objects and advantages of the present invention will become apparent upon reading the following detailed description and upon reference to the drawings in which:

FIG. 20 shows a timing chart of signals for operating the CMOS imager shown in FIG. 19.

DETAILED DESCRIPTION OF THE PREFERRED EMBODIMENT

Figure 1:
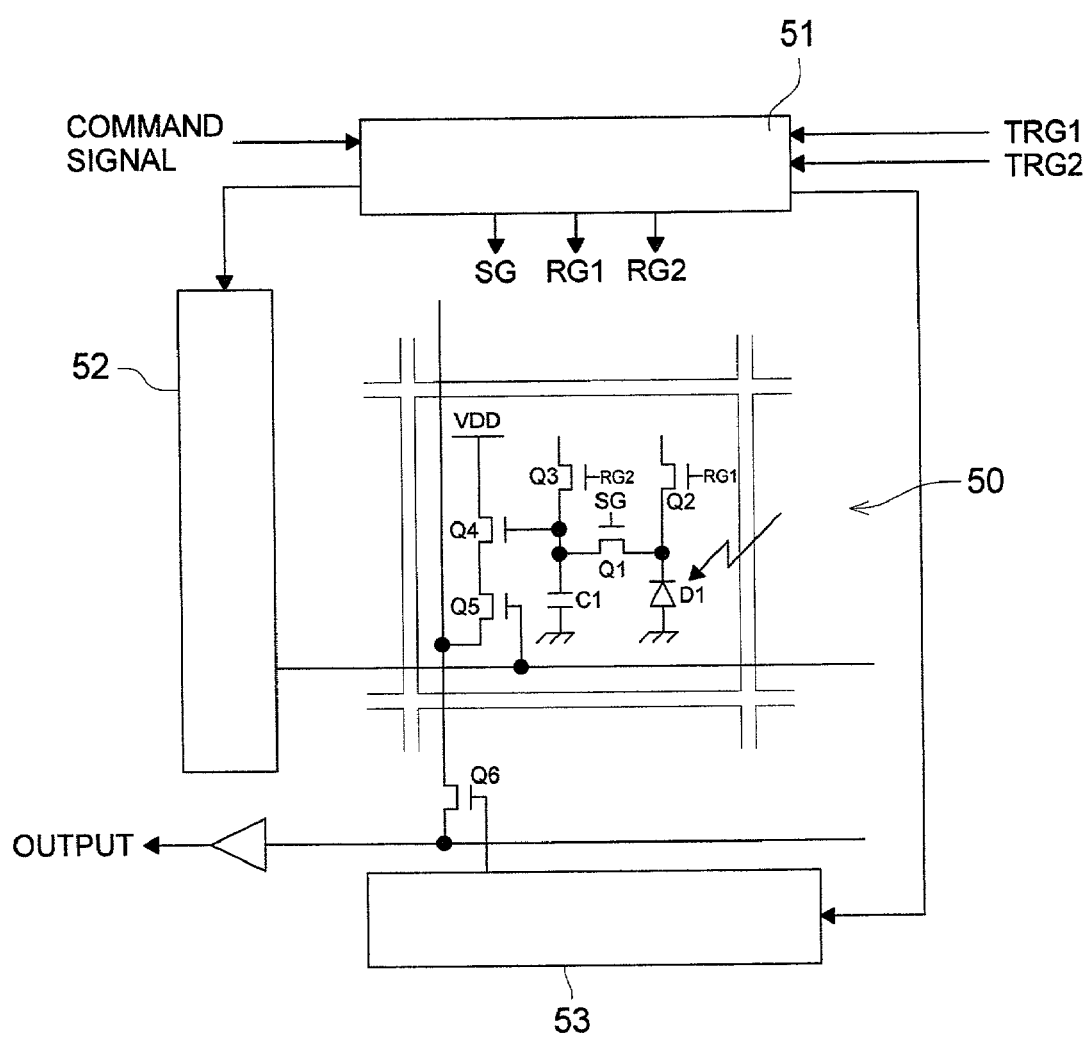
FIG. 1 shows an equivalent circuit diagram of a CMOS-type imager embodied in the present invention.

Initially, an outline of the CMOS-type imager will be detailed in the following. FIG. 1 shows an equivalent circuit diagram of the CMOS-type imager. Although only one of circuit cells 50 corresponding to a single pixel is depicted in FIG. 1, a plurality of circuit cells 50 are two-dimensionally aligned in the imager. Timing-signal generator 51 for generating timing signals to control the whole performance of the imager, vertical shift register 52 for selecting a scanning line, horizontal shift register 53 for selecting one of circuit cells 50 coupled to the same scanning line, output amplifier 55, etc. are fabricated in the peripheral area outside the area of circuit cells 50. Incidentally, it is needless to say that, other than the circuits mentioned above, a CDS circuit, an analogue to digital converter, a kind of signal processing circuit, etc. could be also fabricated in the imager.

Operating modes stored in timing-signal generator 51 can be externally set through serial communication ports. Although only a command signal is depicted by the arrow in FIG. 1, it is assumed that there exist two or three communication ports. The communication ports make it possible to set or modify the data stored in the register included in timing-signal generator 51. Other than the communication ports for serial communication, exclusive ports (for TRG1, TRG2) are also provided in timing-signal generator 51, so as to transmit exposure control signals through the exclusive ports.

Although there would be several methods for controlling the imager, in the embodiment shown in FIG. 1, the exposing operation is commenced at the time of a rising-transition of first trigger pulse TRG1, and completed at the time of a falling-transition of trigger pulse TRG1. Further, the exposing operation is stopped at the time when second trigger pulse TRG2 rises from low to high between the rising-transition and the falling-transition of trigger pulse TRG1 corresponding to an optimum exposure amount.

Now, operations in each of the sections will be detailed in the following more concretely. In circuit cell 50 shown in FIG. 1, a combination of MOS transistor Q2 and photodiode D1, serving as a photo-sensing section and coupled to power source Vrst1 through MOS transistor Q2, performs a light-receiving action after a sweeping-out operation. To sweep out an electronic charge stored in photodiode D1, MOS transistor Q2 is turned ON by changing the status of control-signal RG1 outputted from timing-signal generator 51, so that the electronic charge stored in photodiode D1 is flowed into power source Vrst1. Accordingly, all of the electronic charges stored in the photodiodes are swept out by turning ON MOS transistors Q2 included all of circuit cells 50, and, when turning OFF MOS transistors Q2, the exposing operation is commenced. The abovementioned part serves as a discharging section.

To transfer the electronic charge, photodiode D1 is also coupled to capacitor C1 through MOS transistor Q1, which serves as a charge-storing section. MOS transistors Q1 included all of circuit sells 50 are simultaneously turned ON by changing the status of control-signal SG outputted from timing-signal generator 51 so that the electronic charges stored in photodiodes D1 are transferred to capacitors C1, and then, the exposing operation is completed when MOS transistors Q1 are turned OFF.

Next, a reading-out operation of the electronic charge will be detailed in the following. The electronic charge stored in capacitor C1 is read out through MOS transistors Q4 by turning ON MOS transistors Q5 in a unit of each circuit cell (or one line). A combination of vertical shift register 52 and horizontal shift register 53 selects each of circuit cells 50 by designating an address of each circuit cell. Therefore, it is possible to read out the electronic charge only from the circuit cell designated with its address. For this purpose, it is possible to read out the electronic charge as it is. In the embodiment of the present invention, however, the electronic charges are converted to voltage values for outputting them since the electronic charges are liable to be influenced by noise disturbances.

Then, the reset action of the charge-storing section will be achieved. Concretely speaking, it is possible to sweep out the electronic charge into power source Vrst2 (namely, clear or reset the electronic charge to power source Vrst2) by simultaneously turning ON MOS transistors Q3 included all of circuit cells 50 by the time when the next image-capturing is commenced after the reading-out operation was completed. For this purpose, it is desirable that the reset actions for all of the circuit cells 50, corresponding to all of the pixels, are simultaneously performed, since noise amount values, each of which corresponds to each of the pixels, could be equal relative to each other. It is also applicable, however, that the reset action for each of the circuit cells 50 is successively performed in a unit of each circuit cell after the reading-out operation, in case that the generated noise amount is a sufficiently small value. Finally, amplifier 55 amplifies the readout electronic current of the electronic charge to output a voltage signal.

The function for resetting photodiode D1 can be omitted by excluding MOS transistor Q2 from circuit cell 50. In this case, the exposing operation can be commenced when photodiode D1 is cleared by transferring the electronic charge stored in photodiode D1 to capacitor C1 through MOS transistor Q1. The electronic charge transferred into capacitor C1 is readout during the exposing operation, and then, capacitor C1 becomes empty.

As a modification of the abovementioned example, the imager equipped with unvolatile memories (charge-storing sections) will be detailed in the following. In the imager equipped with both volatile charge-storing sections and unvolatile charge-storing sections, it is desirable that the electronic charges of all circuit cells 50 are simultaneously transferred from the photo-sensing sections to the volatile charge-storing sections, and then, each of the electronic charges stored in the volatile charge-storing sections is successively transferred to each of the nonvolatile charge-storing sections one by one. This is because, generally speaking, a flash-memory, etc. is slow in its writing operation and requires much time for writing in it, and therefore, the timing of writing operation needs to be adjusted.

Figure 2:
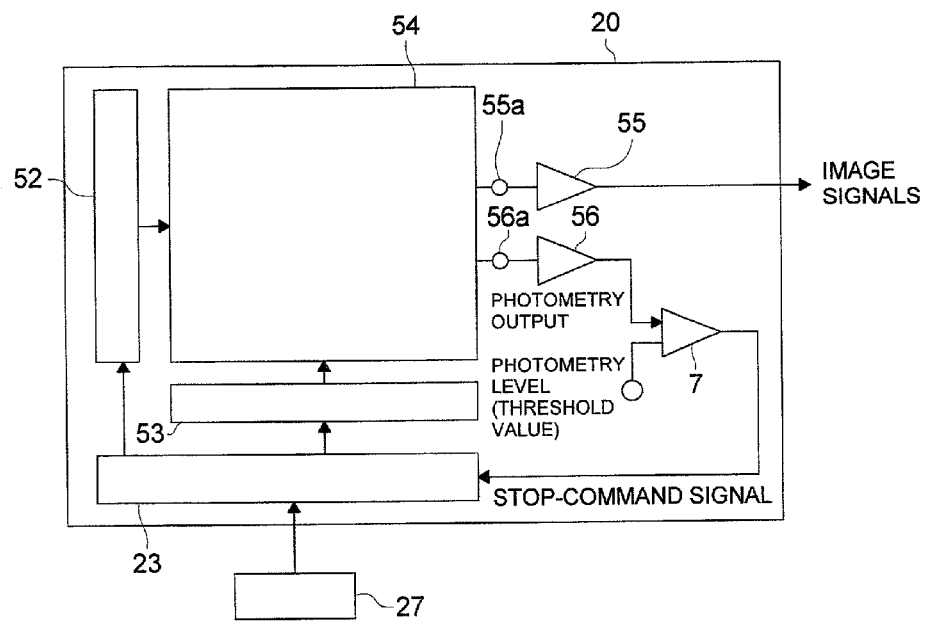
FIG. 2 shows a simplified block diagram of an imager circuit including circuit cells, serving as image-capturing elements shown in FIG. 1.

FIG. 2 shows a simplified block diagram of imager circuit 20 including circuit cells, serving as image-capturing elements, shown in FIG. 1. As aforementioned, the image-capturing operation of each of circuit cells 50, which are two-dimensionally aligned in image-capturing section 54, is controlled by vertical shift register 52 and horizontal shift register 53. Both vertical shift register 52 and horizontal shift register 53 are further controlled by imager controlling circuit 23 (including the timing-signal generator), which receives control signals sent from microprocessor 27 (hereinafter, referred to as MPU 27).

In the embodiment of the present invention, some of circuit cells 50 (hereinafter, referred to as the second group circuit cells) are utilized for performing a photometry of the exposure control operation to detect the light coming from the subject, and others of circuit cells 50 (hereinafter, referred to as the first group circuit cells) are utilized for converting the subject image to image data. Accordingly, signals read from the first group circuit cells are amplified by output amplifier 55 coupled to outputting-port 55a, and then, the amplified signals are outputted to the outside of imager circuit 20. On the other hand, signals read from the second group circuit cells are amplified by output amplifier 56 coupled to outputting-port 56a, and the amplified signals are compared to a predetermined photometry level (a threshold value) by comparator 7 to output compared results to imager controlling circuit 23. As shown in FIG. 2, image-capturing section 54, vertical shift register 52, horizontal shift register 53, imager controlling circuit 23, output amplifiers 55, 56 and comparator 7 are integrated into the one-chip imager IC. Further, a register circuit for setting a photometry level and a digital to analogue converter are also integrated into the one-chip imager IC, though those are not shown in the drawings. In addition, the one-chip imager IC also has a communication capability for changing the photometry level by externally revising the written data stored in the register.

Figure 3:
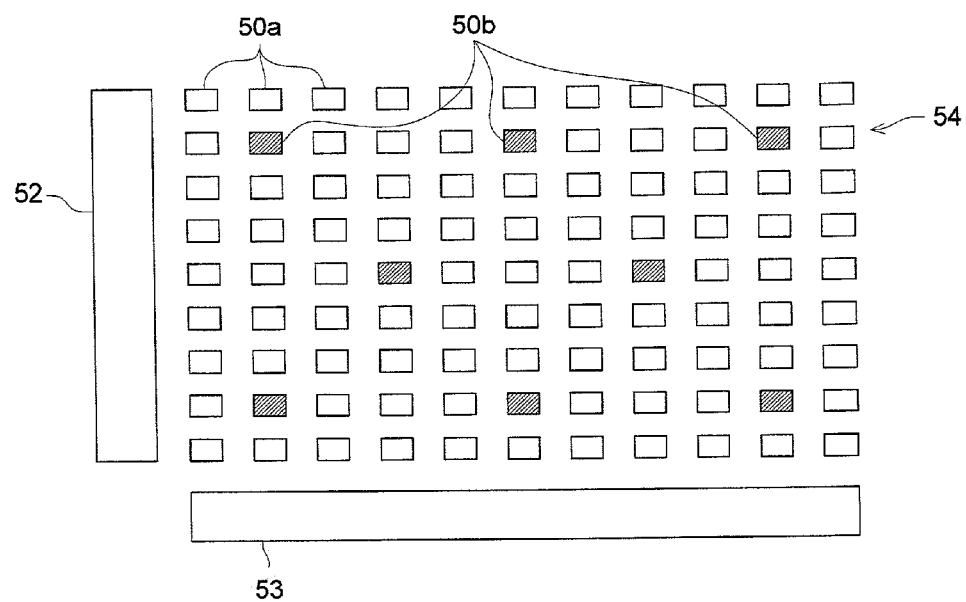
FIG. 3 shows a simplified configuration indicating an arrangement of circuit cells in the image-capturing section.

FIG. 3 shows a simplified configuration indicating an arrangement of circuit cells in image-capturing section 54. In the arrays of first group circuit cells 50a aligned two-dimensionally, second group circuit cells 50b (indicated by gray-tone) are arranged at a predetermined interval. For the purpose of the embodiment of the present invention, a general purpose CMOS imager can be employed as a low cost imager by utilizing some of circuit cells for performing the exposure control operation, instead of utilizing them for obtaining image data. Incidentally, according to the abovementioned configuration, since a part of the image data obtained by the imager are utilized as exposure controlling data, pixel defects (black scars, so to speak) would be generated at the positions of second group circuit cells 50b. Such the pixel defects, however, could not be a serious problem, since it is possible to compensate each of the pixel defects with image data in respect to the pixels adjacent to the pixel concerned, in a similar method for compensating black scars to be generated in the normal condition. Further, provided that the number of first group circuit cells 50a corresponds to 1M pixels, it is desirable that the number of second group circuit cells 50b should be in a range of 30–100. It is also desirable that each of circuit cells 50 is specified by its address and is in a state of always outputting a photometry result. In this case, it is possible to output an added value, which is generated by adding a plurality of output values of the circuit cells. Further, second group circuit cells 50b could be disposed at the predetermined interval either only in the central area or over the whole area of image-capturing section 54.

Figure 4:
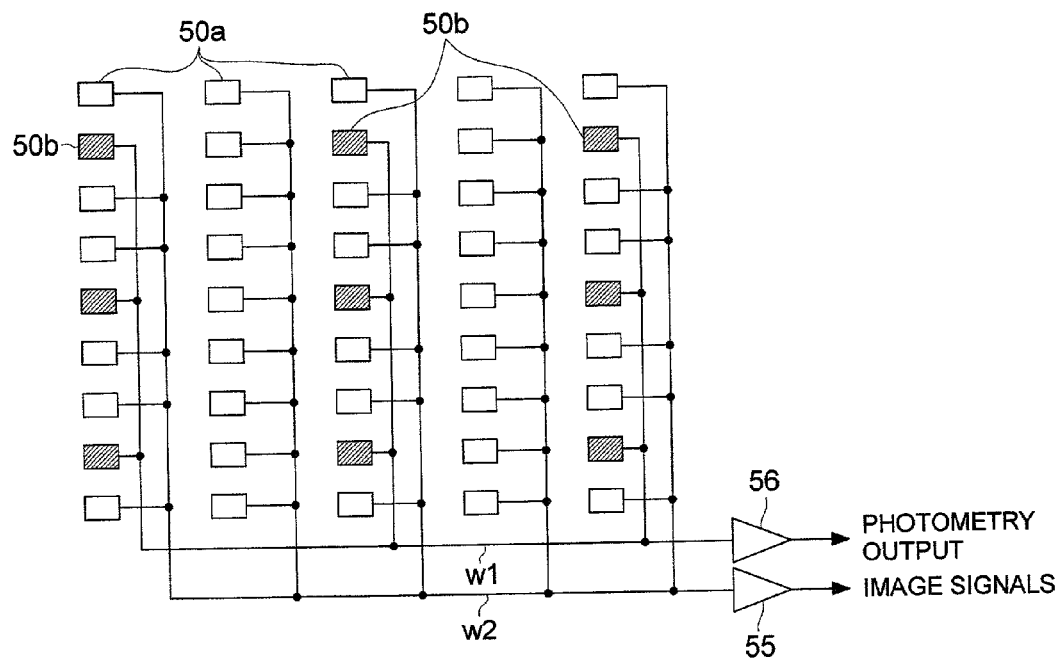
FIG. 4 shows a circuit diagram, indicating connections of wirings for outputting signals of electronic charges induced in circuit cells, when employing the image-capturing section shown in FIG. 3.

FIG. 4 shows a circuit diagram, indicating connections of wirings for outputting signals of electronic charges induced in circuit cells 50, when image-capturing section 54 shown in FIG. 3 is employed for the imager circuit 20. As shown in FIG. 4, first group circuit cells 50a and second group circuit cells 50b are coupled to output amplifier 55 and output amplifier 56 by wiring W2 and wiring W1, respectively, wherein wiring W2 and wiring W1 are independent relative to each other.

Figure 5:
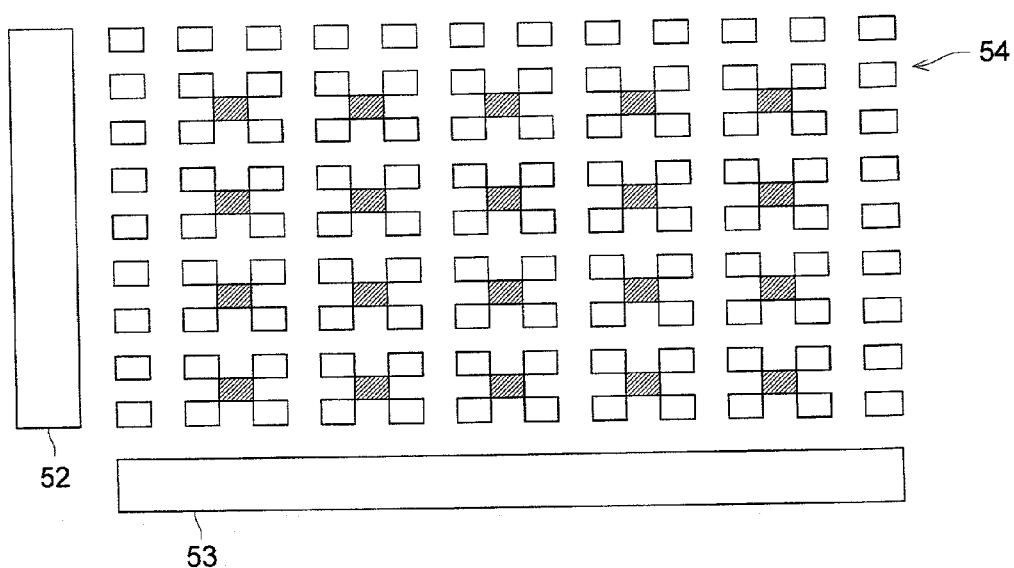
FIG. 5 shows a simplified block diagram of a modified configuration of an embodiment of the present invention, indicating an arrangement of circuit cells in the image-capturing section.

FIG. 5 shows a simplified block diagram of a modified configuration of the abovementioned embodiment of the present invention, indicating an arrangement of circuit cells in image-capturing section 54. As shown in FIG. 5, second group circuit cells 50b (indicated by gray-tone) are disposed at spaces between first group circuit cells 50a, which are two-dimensionally aligned. According to the embodiment shown in FIG. 5, although CMOS circuit cells serving as image-capturing elements and a wiring for connecting second group circuit cells 50b should be exclusively fabricated in the imager, it is possible to maintain a high quality of images, since second group circuit cells 50b could not be a cause of pixel defects.

Figure 6:
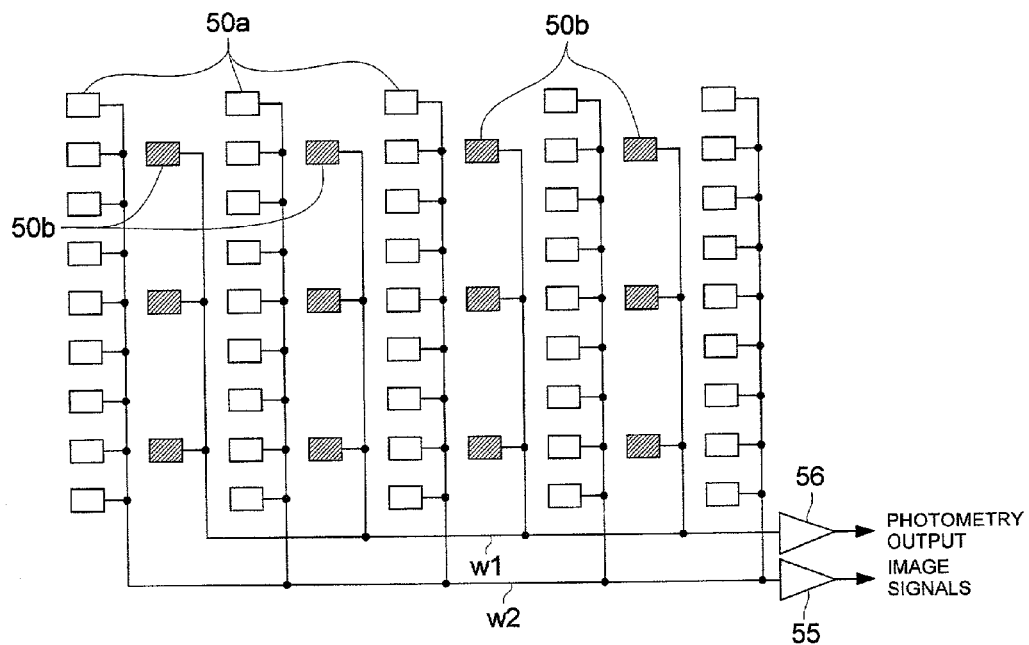
FIG. 6 shows a circuit diagram, indicating connections of wirings for outputting signals of electronic charges induced in circuit cells, when employing the image-capturing section shown in FIG. 5.

FIG. 6 shows a circuit diagram, indicating connections of wirings for outputting signals of electronic charges induced in circuit cells 50, when image-capturing section 54 shown in FIG. 5 is employed for the imager circuit 20. As shown in FIG. 6, first group circuit cells 50a and second group circuit cells 50b are coupled to output amplifier 55 and output amplifier 56 by wiring W2 and wiring W1, respectively, wherein wiring W2 and wiring W1 are independent relative to each other.

Figure 7:
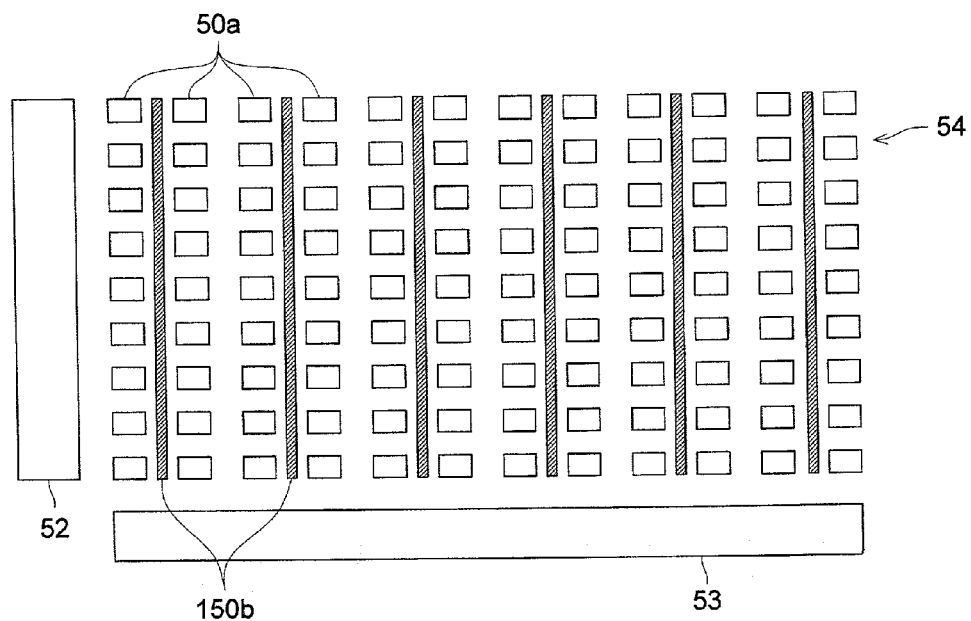
FIG. 7 shows a simplified block diagram of another modified configuration embodied in the present, indicating an arrangement of circuit cells in the image-capturing section.

FIG. 7 shows a simplified block diagram of another modified configuration embodied in the present, indicating an arrangement of circuit cells in image-capturing section 54. As shown in FIG. 7, line-type image-capturing elements 150b (indicated by gray-tone) are vertically disposed at spaces between first group circuit cells 50a, which are two-dimensionally aligned. According to the embodiment shown in FIG. 7, although CMOS circuit cells serving as line-type image-capturing elements should be exclusively fabricated in the imager, it becomes possible to generate exposure control data based on a sufficient amount of induced signals by effectively utilizing the spaces between first group circuit cells 50a without generating any pixel defects, and it is possible to shorten a length of the wiring for line-type image-capturing elements 150b. Although it is desirable that line-type image-capturing elements 150b are disposed at every vertical spaces between first group circuit cells 50a, it is also applicable that line-type image-capturing elements 150b are vertically disposed at an interval of every two or more spaces between first group circuit cells 50a. It is also possible that, other than circuit cells, either a photodiode(s) or a phototransistor(s) can be employed for line-type image-capturing elements 150b serving as second photo-electronic converting elements.

Figure 8:
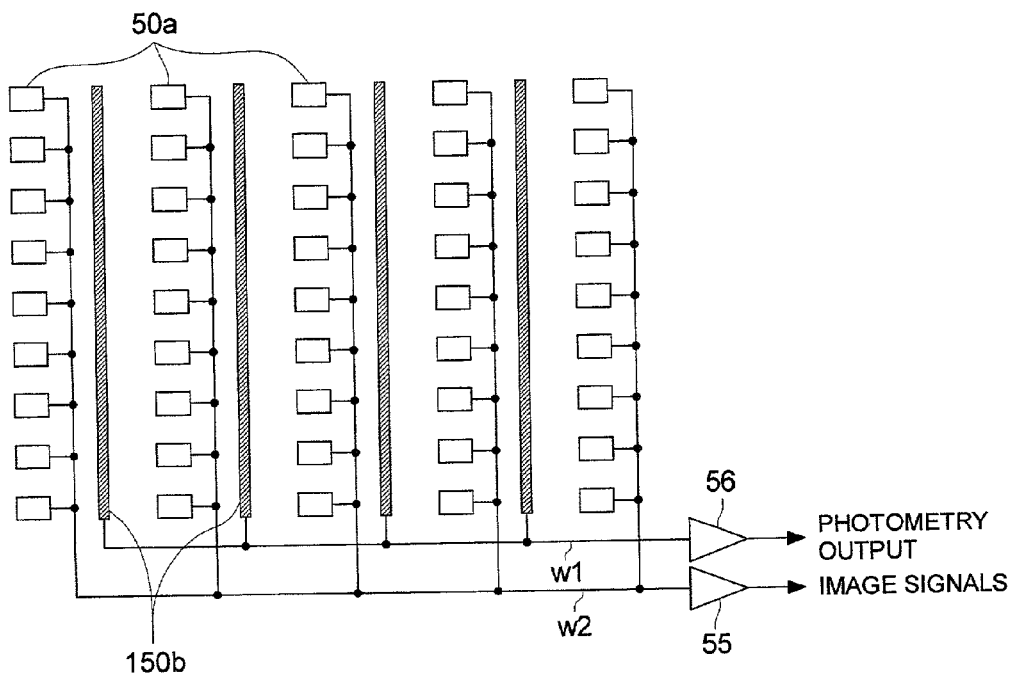
FIG. 8 shows a circuit diagram, indicating connections of wirings for outputting signals of electronic charges induced in circuit cells, when employing the image-capturing section shown in FIG. 7.

FIG. 8 shows a circuit diagram, indicating connections of wirings for outputting signals of electronic charges induced in circuit cells 50, when image-capturing section 54 shown in FIG. 7 is employed for the imager circuit 20. As shown in FIG. 8, first group circuit cells 50a and second group circuit cells 50b are coupled to output amplifier 55 and output amplifier 56 by wiring W2 and wiring W1, respectively, wherein wiring W2 and wiring W1 are independent relative to each other.

Methods for reading out signals from the second group circuit cells will be described as follow.
1) The first method is that the signals are read out at a time by simultaneously accessing all of the second group circuit cells, and then, the read signals are summed to output an added signal. In this case, imager-controlling circuit 23 designates X-Y addresses so as to turn ON all the output transistors included in all of the second group circuit cells to read the signals.
2) The second method is that the signals are read out one by one from each of the second group circuit cells by switching the circuit cell to be read in a high-speed. In this case, considering the use of the strobe lighting, the signals should be read out within a time interval sufficiently shorter than the duration time of the strobe light. The read signals, which are read out one by one, are summed at an external section.
3) The third method is the combination of the two methods mentioned above. Namely, in the third method, the second group circuit cells are divided into several groups, and the signals are read out for every group.

According to the first method, since the signals are read out at a time and the read signals are summed, it becomes possible not only to perform a high-speed photometry, but also to exclude complicated circuits and algorisms for the photometry operation. In the second method, since the duration time of the strobe light is generally set at around several hundreds microseconds, the access time for reading the circuit cells should be shorter than several nanoseconds, desirably, shorter than around ten nanoseconds, provided that the number of the second group circuit cells is around 100, though the access time would vary depending on the number of the circuit cells. The second method, however, makes it possible to perform a fine photometry controlling operation detailed later. The third method can be positioned at a neutral between the above two methods, and has both advantages and shortcomings of them. For instance, it might be possible that the signals of circuit cells for one column are read out at a time, and then, the read signals are sequentially switched over the whole columns.

When the signals are read out one by one, it is possible to adaptively utilize the read signals. Since each of the signals can be read out from every circuit cell when the CMOS imager is employed, for instance, when capturing an image with the strobe light, it is possible to utilize specific circuit cells, signals of which significantly vary after emitting the strobe light. Initially, the signals are read out from all of the second group circuit cells, and then, several or all circuit cells, signals of which might significantly vary after emitting the strobe light, are selected to read out signals only from the selected circuit cells. In other words, for instance, when capturing a human portrait, the photometry can be performed in focus of a body part to be measured, such as a face, a breast, etc. Further, in the above case, since the number of circuit cells utilized for the photometry is effectively reduced, not only the cycle time for reading operation can be shortened, but also the resolution in the time domain increases higher than ever, resulting in more accurate photometry operations. Further, when the second group circuit cells are exclusively provided, it is possible to exclusively provide a reading-circuit for them. Although an output-circuit can be also provided exclusively, it is possible to commonly use the output-circuit both for image-signals and photometry-signals.

Figure 9:
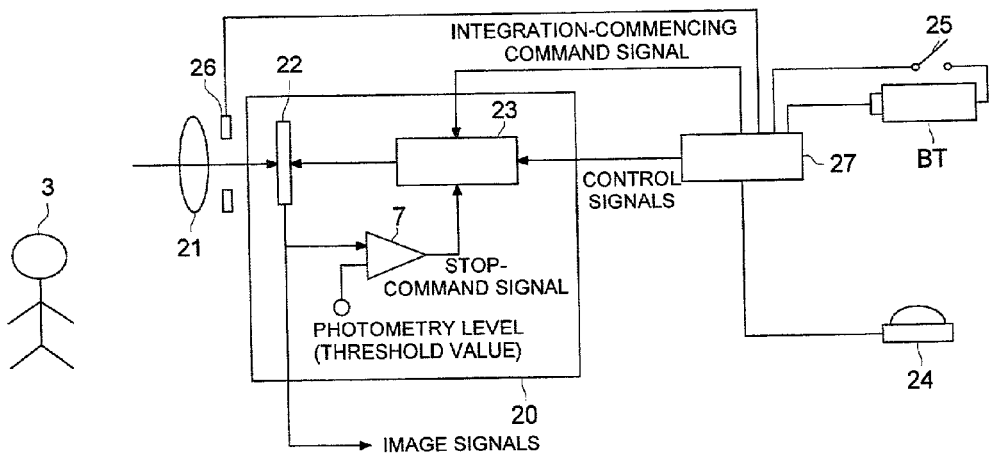
FIG. 9 shows a simplified block diagram of a configuration of an electronic still camera, as an example of the image-capturing apparatus embodied in the present invention.

FIG. 9 shows a simplified block diagram of a configuration of an electronic still camera, as an example of the image-capturing apparatus embodied in the present invention. Numeral 27 indicates a microprocessor (MPU) numeral 24 indicates a release switch serving as a command signal outputting means, and numeral 25 indicates a power switch through which electronic power is supplied from battery BT to MPU 27, etc. when power switch 25 is turned ON and cut off when power switch 25 is turned OFF. Further, numeral 21 indicates a photographic lens for focusing the light reflected from subject 3, and numeral 22 indicates a CMOS imager shown in FIG. 1. Numeral 23 indicates an imager controlling circuit, which receives stop-command signal from comparator 7, serving as a judging section, to controls the exposure amount of CMOS imager 22. Operations of the electronic still camera, having the configuration mentioned above, will be detailed in the following.

Figure 10:
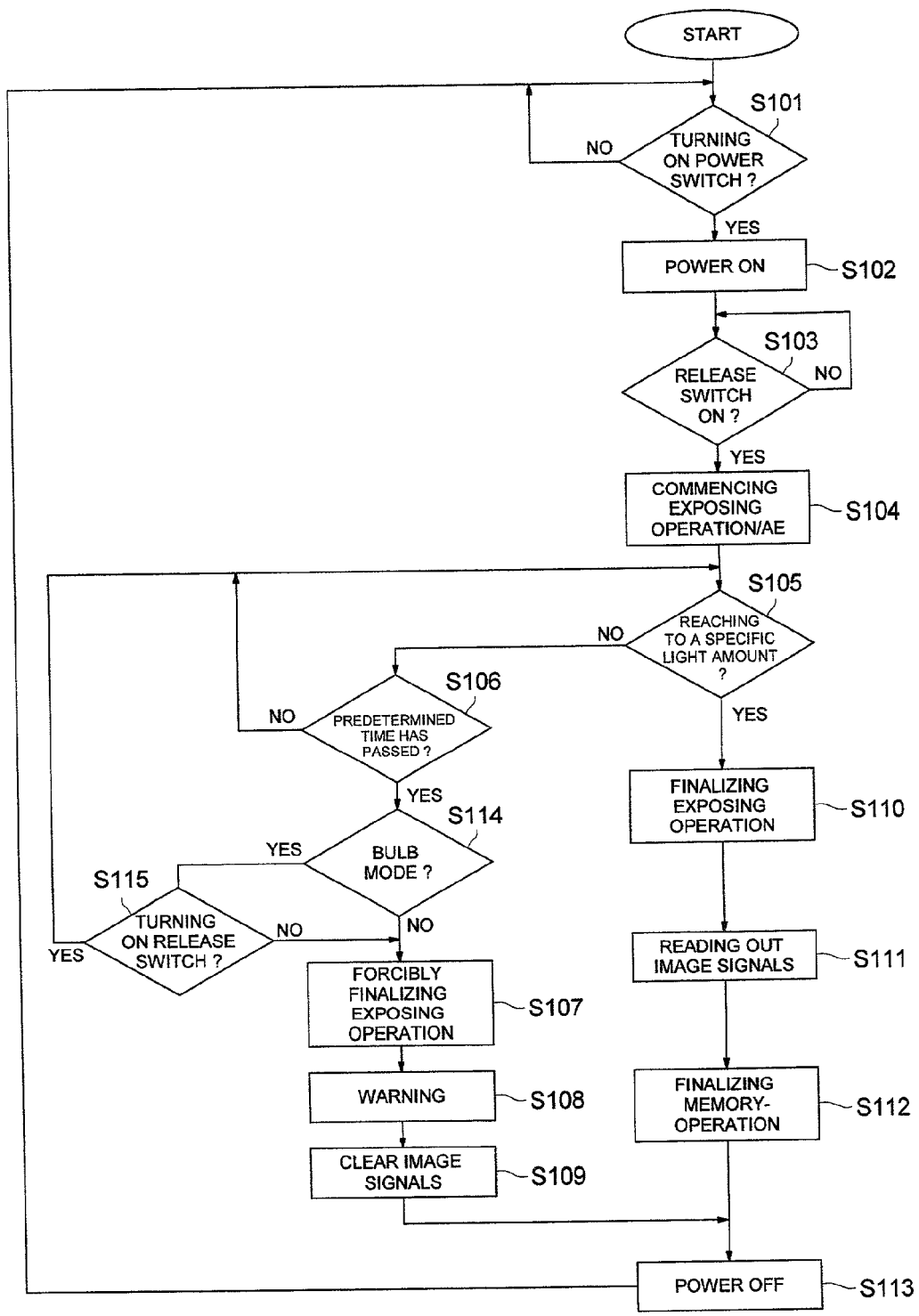
FIG. 10 shows a flowchart of operations of an electronic still camera, serving as a first embodiment of the present invention.

FIG. 10 shows a flowchart of operations of an electronic still camera, serving as a first embodiment of the present invention.

The flowchart shown in FIG. 10 comprises the steps of: S101, determining whether or not power switch 25 is turned ON; S102, supplying electronic power from battery BT to MPU 27, etc., when determining that power switch 25 is turned ON in step S101; S103, determining whether or not release switch 24 is pushed; S104, simultaneously commencing photo-electronic converting actions of first group circuit cells 50a, serving as first photo-electronic converting elements for capturing an image, and second group circuit cells 50b, serving as second photo-electronic converting elements for performing a photometry, under a command signal sent from MPU 27 when determining that release switch 24 is pushed in step S103; S105, determining whether or not the exposure amount reaches to a specific light amount (a predetermined value) by means of comparator 7, wherein MPU 27 sends command signals to imager controlling circuit 23 so that the signals stored in second group circuit cells 50b are periodically read out within a short cycle time and comparator 7 compares a total sum of the read signals with a threshold value; S106, in which MPU 27 determines whether or not a predetermined time has passed since release switch 24 was pushed when not in step S105; S110, finalizing the photo-electronic converting actions of first group circuit cells 50a when determining that the exposure amount reaches to a specific light amount in step S105; Sill, reading out the electronic charges stored in first group circuit cells 50a and converting them to image data by applying analogue to digital conversion and other processing; S112, storing the image data in a memory (not shown in the drawings); and S113, automatically turning OFF the power supply from battery BT. Or during step S113, it is possible to return to step S103 so as to continue the image-capturing operation.

The flowchart shown in FIG. 10 further comprises the steps of: S114, determining whether or not a bulb mode (a first mode) is set by the mode switch (not shown in the drawings), serving as a mode-selecting means, when MPU 27 determines that a predetermined time has passed since release switch 24 was pushed before the exposure amount reaches to the specific light amount in step S106; S115, continuing the exposing operation as far as release switch 24 is continuously pushed under a command signal sent from MPU 27 when determining that the bulb mode is set in step S114; S107, in which MPU 27 forcibly finalizes the photo-electronic converting actions of first group circuit cells 50a at the time when release switch 24 is released from the pushed state; S108, displaying a warning message of, for instance, "Since exposure amount is under the appropriate level, photographing operations are halted." on the liquid-crystal display panel (not shown in the drawings), serving as a warning means; and S109, erasing the electronic charges stored in first group circuit cells 50a and second group circuit cells 50b and returning to step S113 to turn OFF the power source under command signals sent from MPU 27.

Further, when determining that a non-bulb mode (a second mode) is set by the mode switch (not shown in the drawings) in step S114, MPU 27 forcibly finalizes the photo-electronic converting actions of first group circuit cells 50a in step 107, irrespective of whether or not release switch 24 is still pushed. Since the steps followed by step 107 are the same as the above, the explanations are omitted.

According to the first embodiment shown in FIG. 10, since the photo-electronic converting actions of second group circuit cells 50b are commenced at the same time when the photo-electronic converting actions of first group circuit cells 50a are commenced, it becomes possible to perform an accurate photometry in respect to the field brightness under photographing-operation, and therefore, it becomes possible to obtain an appropriate exposure amount. Incidentally, when MPU 27 determines that a predetermined time has passed since release switch 24 was pushed before the exposure amount reaches to the specific light amount, it is also applicable that a warning message of, for instance, "Exposure amount is under the appropriate level." is merely displayed on the liquid-crystal display panel (not shown in the drawings) for warning the photographer, without forcibly finalizing the photo-electronic converting actions of first group circuit cells 50a. This is because, sometimes, the photographer intentionally sets a long exposing time in purpose of capturing a scene at night.

Figure 11:
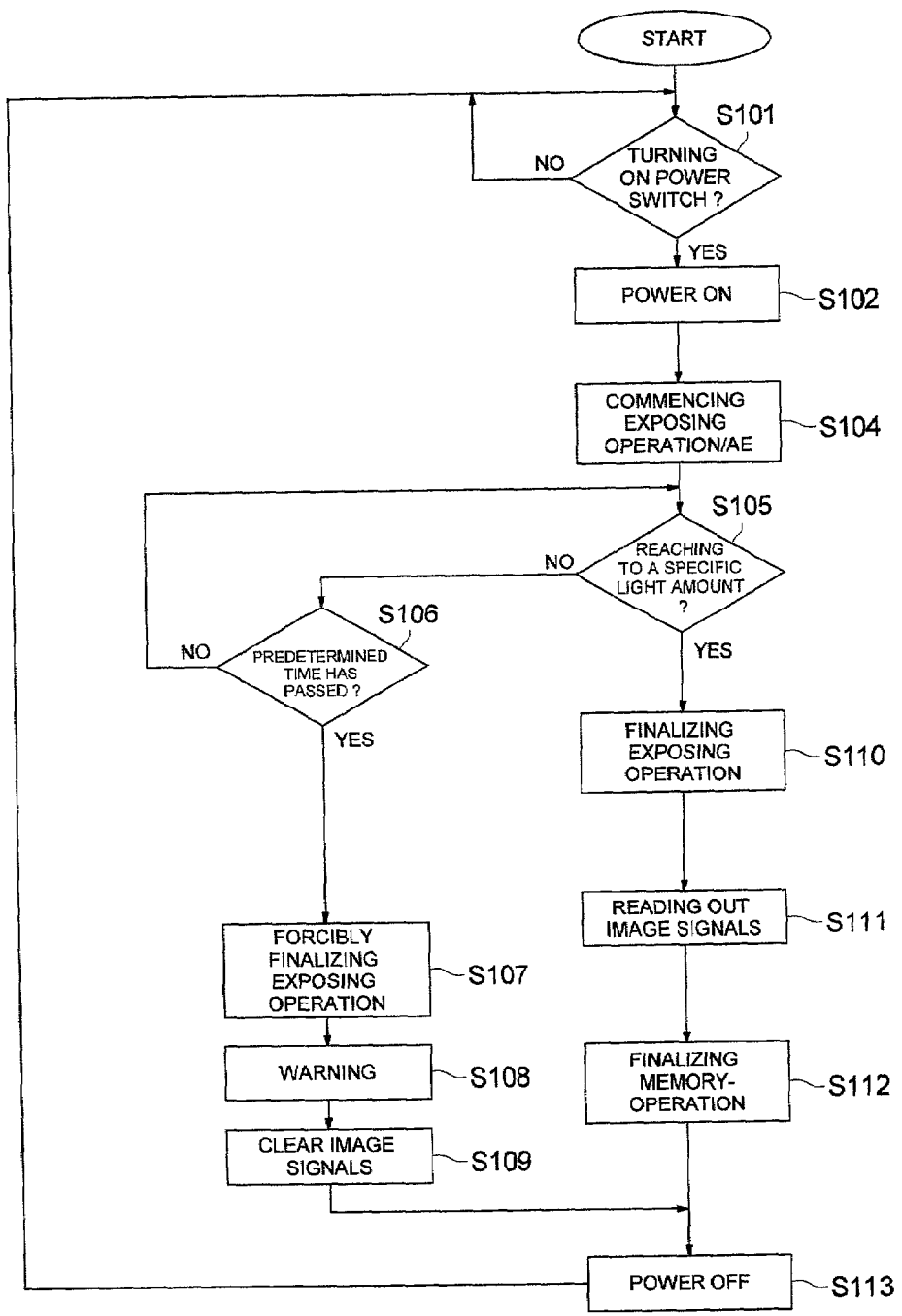
FIG. 11 shows another flowchart of operations of an electronic still camera, serving as a second embodiment of the present invention.

FIG. 11 shows another flowchart of operations of an electronic still camera, serving as a second embodiment of the present invention. The second embodiment is different from the first embodiment in the point that the bulb mode and the release switch are excluded and the power switch also serves as the release switch in the second embodiment. Concretely speaking, when power switch 25 is turned ON in step S101 shown in FIG. 11, electronic power is supplied from battery BT to MPU 27, etc., to immediately commence the photo-electronic converting actions of first group circuit cells 50a and second group circuit cells 50b (step S104). Incidentally, since power switch 25 is automatically turned OFF every time when completing an image-capturing action, it becomes possible to save the power consumption by cutting OFF the power supplied to each of circuit elements during the time waiting for a next image-capturing action. Since other operations are the same as those described in the aforementioned embodiment, explanations for them are omitted.

Further, as a modification of the aforementioned embodiment, it might be possible that the electronic still camera employs a variable aperture. Concretely speaking, when MPU 27 determines that a predetermined time has passed since the release switch was pushed before the exposure amount reaches to the specific light amount, MPU 27 could drive the variable aperture in a direction for increasing the aperture diameter so as to increase the light amount received on CMOS imager 22, in order to obtain an appropriate exposure amount. Incidentally, although details of the variable aperture are well-known and need not be explained, both a variable aperture in which the aperture diameter varies stepwise and another variable aperture in which a plurality of wing-type shutter blades move for continuously changing the aperture diameter, are available for this purpose.

In the embodiments mentioned above, first group circuit cells 50a for obtaining the image data and second group circuit cells 50b for obtaining the exposure controlling data are independent relative to each other. However, in case that second group circuit cells 50b are nondestructive readout memories, it is possible to confirm an amount of electronic charge stored in each circuit cell without erasing the electronic charge, and therefore, it becomes possible to utilize the electronic charges stored in second group circuit cells 50b for a part of the image data, resulting in an improvement of the image quality.

As described in the above, since it is possible to readout an electronic charge stored in arbitral circuit cell when the CMOS imager is employed, a part of the circuit cells included in the CMOS imager can be utilized for obtaining the exposure controlling data, and accordingly, the conventional photo-detecting element for measuring a field brightness can be excluded from the electronic still camera, resulting in a cost-reduction of the camera and an improvement of design flexibility for the outlook of the camera.

Figure 12:
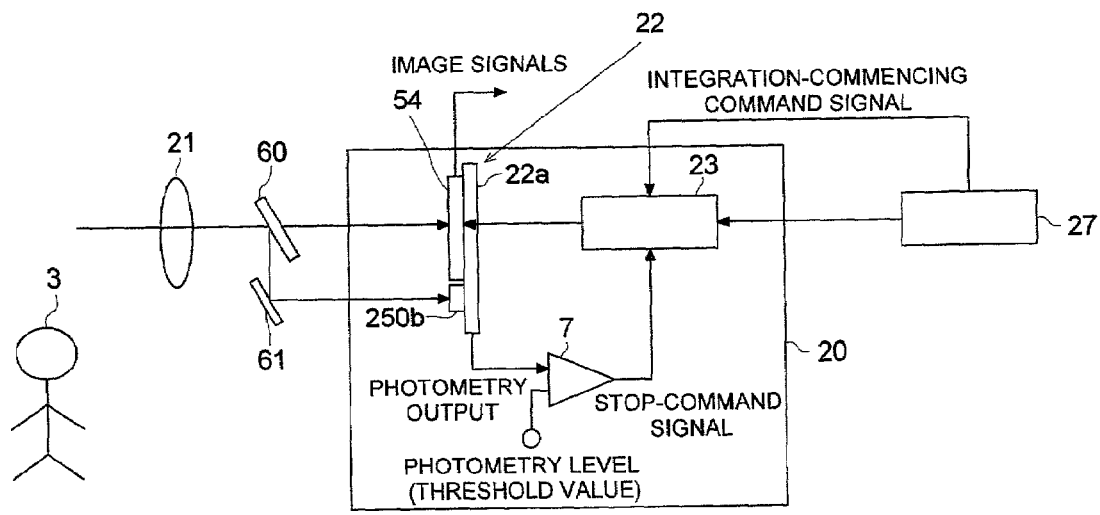
FIG. 12(a) shows a simplified block diagram of a configuration of an electronic still camera, serving as a third embodiment of the present invention.
FIG. 12(b) shows a front view of a CMOS imager, viewing from the subject side.
Figure 12:
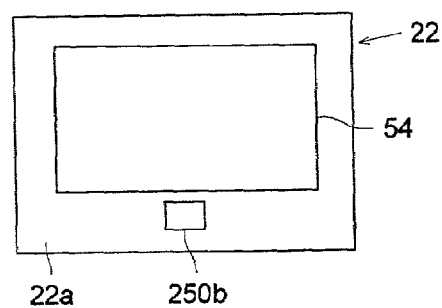

FIG. 12(a) shows a simplified block diagram of a configuration of an electronic still camera, serving as a third embodiment of the present invention. FIG. 12(b) shows a front view of CMOS imager 22, viewing from the subject side. In FIG. 12(a), release switch 24, power switch 25 and battery BT are omitted to depict. Further, since the mainly different point between the third embodiment shown in FIG. 12(a) and the embodiment shown in FIG. 9 is the position of the second group circuit cells, the explanations for the same points will be omitted in the following.

As shown in FIG. 12(b), image-capturing section 54, having the first group circuit cells (not shown in FIG. 12(b)), is mounted on circuit board 22a, and under image-capturing section 54, photo-sensing element 250b including the second group circuit cells is also mounted. A photometry result outputted from photo-sensing element 250b is applied to comparator 7 in the same manner as in the embodiment shown in FIG. 9. In this configuration, it is also possible that photo-sensing element 250b includes only one circuit cell, which serves as the second group circuit cells.

Further, in the third embodiment, half mirror 60 is disposed between photographic lens 1 and image-capturing section 54 to reflect a part of the light reflected from subject 3 in a direction orthogonal to the optical axis. The part of the light coming from half mirror 60 is further reflected by Mirror 61 so as to enter into photo-sensing element 250b. With respect to the exposure controlling method using the output signal of photo-sensing element 250b, explanations are omitted since such the method is the same as that of the aforementioned embodiment.

According to the third embodiment, since a general purpose CMOS imager can be employed for image-capturing section 54 including wirings for reading out the signals, it becomes possible to reduce a manufacturing cost of the electronic still camera more than that of a conventional one. Incidentally, half mirror 60 and mirror 61 constitute an optical system.

Although the embodiments of the present invention are detailed in the above, it is needless to say that the scope of the present invention is not limited to the abovementioned embodiments, and each of the embodiments could be modified or improved into an appropriate configuration by a skilled person. For instance, in the electronic still camera equipped with a flash-lighting apparatus, by emitting a flash-light from the flash-lighting apparatus when it is determined that a predetermined time has passed since the release switch was pushed before the exposure amount reaches to the specific light amount, it might be possible to obtain an appropriate exposure amount.

According to the image-capturing apparatus embodied in the present invention, it becomes possible to reduce the power consumption at a low level, and to provide an image-capturing apparatus, which can perform an appropriate exposure controlling operation.

Figure 13:
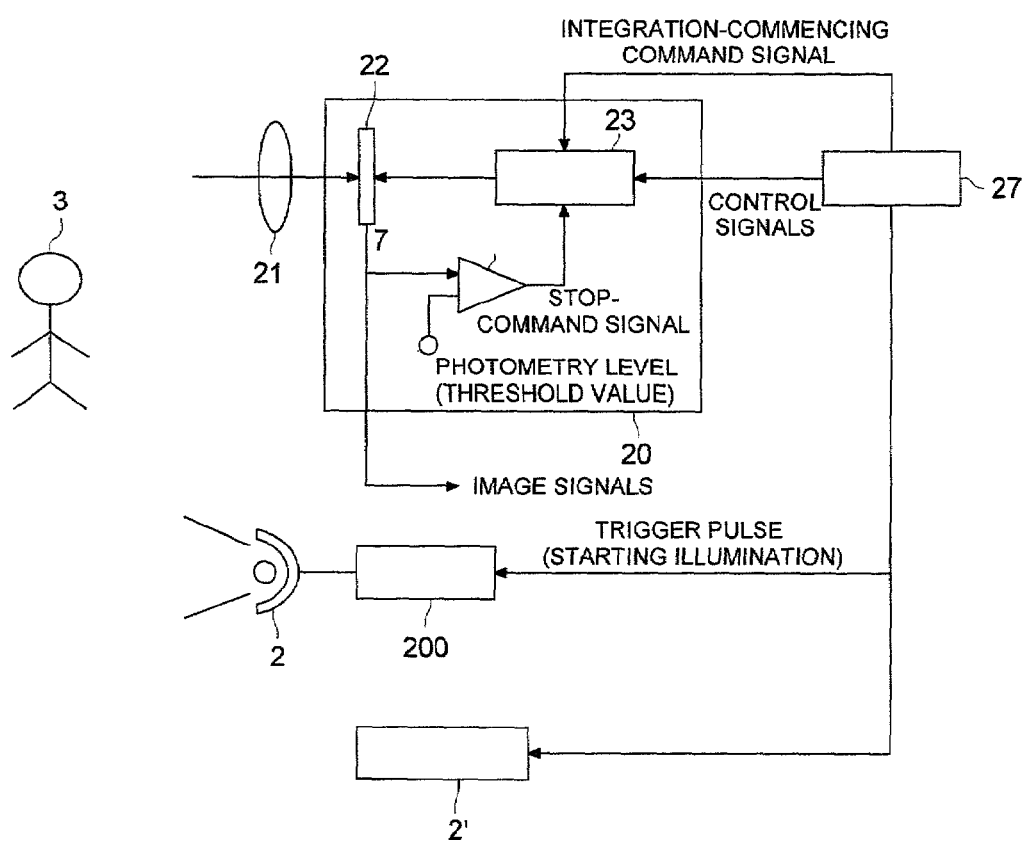
FIG. 13 shows a simplified block diagram of a configuration of an electronic still camera, serving as a fourth embodiment of the image-capturing apparatus embodied in the present invention.

FIG. 13 shows a simplified block diagram of a configuration of an electronic still camera, serving as a fourth embodiment of the image-capturing apparatus embodied in the present invention. Numeral 27 indicates a microprocessor (MPU), which determines a degree of aperture, a shutter speed, etc., and outputs command signals to the various kinds of incorporated circuits, numeral 200 indicates a strobe circuit to drive a light emitting tube mounted in strobe 2 so that strobe 2 emits the strobe light in response to a triggering command signal (a light-emission starting signal) sent from MPU 27, numeral 21 indicates a photographic lens to focus the light reflected from subject 3, numeral 22 indicates a CMOS imager shown in FIG. 13. Numeral 23 indicates an imager controlling circuit, which receives stop-command signal from comparator 7, serving as a judging section, to controls the exposure amount of CMOS imager 22. Operations of the electronic still camera, having the configuration mentioned above, will be detailed in the following.

Figure 14:
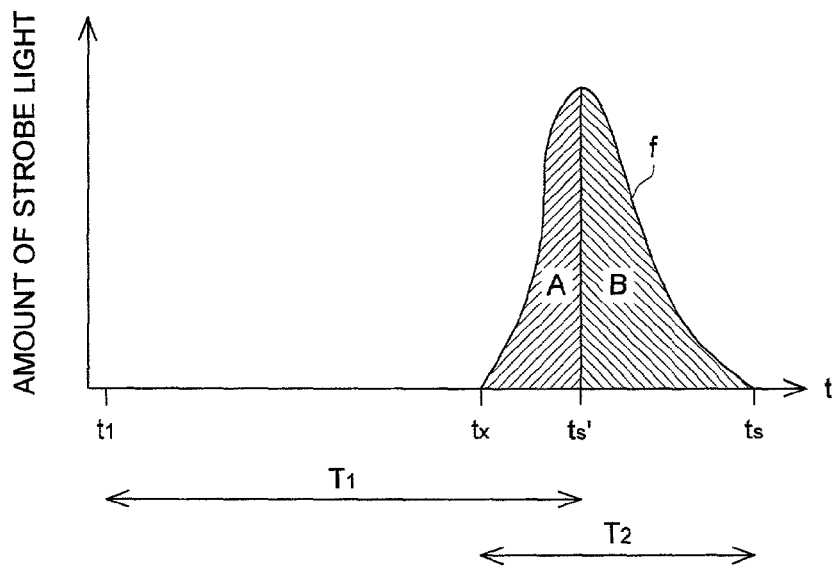
FIG. 14 shows a graph of a strobe-light emission characteristic of a strobe device.

FIG. 14 shows a graph of a strobe-light emission characteristic of the strobe device. At first, referring to FIG. 14, operations of the fourth embodiment will be detailed in the following. In FIG. 14, line f indicates a strobe-light emission curve when strobe 2 fully emits the strobe light. In the fourth embodiment, based on the shutter opening second-time established in advance (for instance, equivalent to the time interval from t1–t2 shown in FIG. 14 when set at 1/60 second), strobe 2 starts to emit the strobe light at time tx being shorter than time t2, at which the shutter closes, by maximum illumination-duration time T2 of strobe 2 (typically, in a range of 50–500 μs). In this case, it is applicable that strobe 2 fully emits the strobe light without controlling an amount of emitted light. Incidentally, in the forth embodiment, when the conventional AE mode is selected, the brightness of the subject is measured at first, based on an amount of the light entering into second group circuit cells 50b (shown in FIG. 3) of CMOS imager 22 through photographic lens 21, and then, MPU 27 determines the degree of aperture and the shutter opening second-time, and the strobe mode is automatically selected when the shutter opening second-time exceeds 1/60 second. Now, when imager controlling circuit 23 sends trigger pulse TRG1 to timing-signal generator 51 at time t1, the electronic charge stored in each of the photo-sensing sections (photodiode D1 shown in FIG. 1) is swept out, in order to commence the exposing-operation.

Next, after a predetermined time has passed, strobe 2 is driven by strobe circuit 200 so as to emit the strobe light in response to the trigger pulse sent from MPU 27 at time tx. Then, the strobe light emitted from strobe 2 illuminates subject 3, and the light reflected from subject 3 enters into CMOS imager 22 through photographic lens 21. During the above process, the amount of strobe light is abruptly increases as shown in FIG. 14. Further, at time tx when MPU 27 sends the trigger pulse for activating the strobe light emitting action to strobe circuit 200, MPU 27 simultaneously sends an integration-commencing command signal to an integrating circuit (not shown in the drawings), to commence the integration of the strobe light.

The integrating circuit integrates the signals outputted from second group circuit cells 50b, and the integrated output signal increases with the time elapse. Then, at time ts' when the integrated output signal reaches to a reference light-adjusting level established in advance, comparator 7 changes its output level to output a stop-command signal. It is also applicable that the stop-command signal is outputted from MPU 27 coupled to comparator 7.

When imager controlling circuit 23 receives the stop-command signal, imager controlling circuit 23 outputs trigger pulse TRG2 to timing-signal generator 51 (shown in FIG. 1) to finalize the exposing operation of CMOS imager 22. Accordingly, the electronic charge corresponding to each pixel of the image of subject 3, obtained at an optimum exposing condition, can be stored in each of the circuit cells. In the above process, although the integrating time of CMOS imager 22 becomes (ts'–t1), which is shorter than initial set time of (ts–t1) by (ts–ts'), the time of (ts–ts') can be ignored, since it is very short time (namely, ts–t1>>ts–ts'), and since the shutter opening second-time (for instance, t1–ts at 1/60 second) has not been a significant value by nature.

On the other hand, strobe 2 continues to emit the strobe light even after time ts' has elapsed, and stops emitting at time ts (namely, the duration time of the strobe light is T2). Region A indicates a part of exposure amount, which is integrated by CMOS imager 22 and is converted to image data, while region B indicates another part of exposure amount, which has not contributed to the image-forming operation. As mentioned above, according to the forth embodiment, it becomes possible to store the electronic charge, which is obtained at the time when the exposure amount reaches to the optimum value, in each of the circuit cells, without stopping the strobe light in a mid-course of its emission, the amount of which has been difficult to be controlled accurately. Accordingly, when using a strobe lighting, it becomes possible to accurately control the exposure amount with a simple configuration.

The aforementioned exposure controlling method can be also applied for the day-time synchronous strobe lighting (namely, to emit a strobe light against a subject in a backlight field of day-time, etc., in order to capture an image of the subject in an appropriate exposing condition) in the same manner as in the aforementioned embodiment, except that the shutter opening second-time (equivalent to 1/60 second in the aforementioned embodiment) initially set varies depending on the brightness of the subject. However, if the shutter opening second-time is set at too short time, such a short second-time would influence the accuracy of the exposure amount since the relationship of ts–t1>>ts–ts' would be no longer established. To avoid this, it is necessary to apply some countermeasures such that a degree of aperture opening is set at a small vale and the shutter opening second-time is set at more longer value, etc. An example will be detailed in the following.

For instance, it is assumed that the shutter is closed when the exposure amount reaches to the predetermined value immediately after strobe 2 emits the strobe light. In other words, it is assumed that there is a deviation of the shutter opening second-time (ts–ts') substantially equivalent to maximum illumination-duration time T2 of strobe 2.

To make the deviation of the shutter opening second-time smaller than −0.2 EV, the following relation should be fulfilled.

$$y<(1-2^{-0.2})x$$

where "y" [ms] represents a strobe-light duration time, and "x" [ms] represents a shutter speed capable of capturing an image with strobe lighting. Therefore, to make the shutter opening second-time of up to 1/250 possible, the strobe-light duration time should be shorter than 517 μs, and to make the shutter opening second-time of up to 1/500 possible, the strobe-light duration time should be shorter than 258 μs, and to make the shutter opening second-time of up to 1/1000 possible, the strobe-light duration time should be shorter than 129 μs. Further, to make the deviation of the shutter opening second-time smaller than −0.4 EV, the following relation should be fulfilled as well.

$$y<(1-2^{-0.4})x$$

Therefore, to make the shutter opening second-time of up to 1/250 possible, the strobe-light duration time should be shorter than 968 μs, and to make the shutter opening second-time of up to 1/500 possible, the strobe-light duration time should be shorter than 484 μs, and to make the shutter opening second-time of up to 1/1000 possible, the strobe-light duration time should be shorter than 242 μs aid, and to make the shutter opening second-time of up to 1/2000 possible, the strobe-light duration time should be shorter than 121 μs. When the deviation of the shutter opening second-time is large, the exposure amount of the subject illuminated by the strobe light is optimum, but the potion not illuminated by the strobe light becomes either underexposure or overexposure.

Further, it is possible that maximum illumination-duration time T2 (typically, in a range of 50–500 μs) can be varied in conjunction with distance information sent from AF (Automatic Focusing) system (not shown in the drawings), instead of fixing it at a constant value. For instance, a value of (ts'−tx) can be estimated as a small value, since only a small amount of the strobe light is required when a value of (subject distance)×(aperture value) is small, considering with a set aperture. Conversely, a value of (ts'−tx) can be estimated as a large value, since a large amount of the strobe light is required when a value of (subject distance)×(aperture value) is large.

Figure 15:
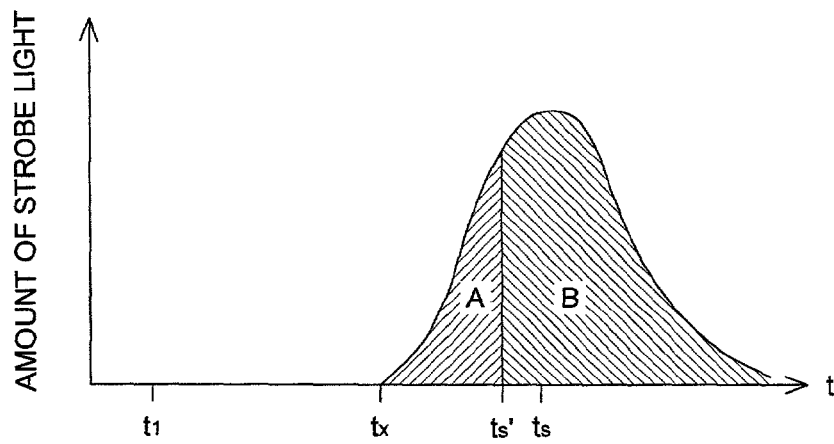
FIG. 15 shows a graph of a strobe-light emission characteristic of a strobe device, when the value of (subject distance)×(aperture value) is small.
Figure 16:
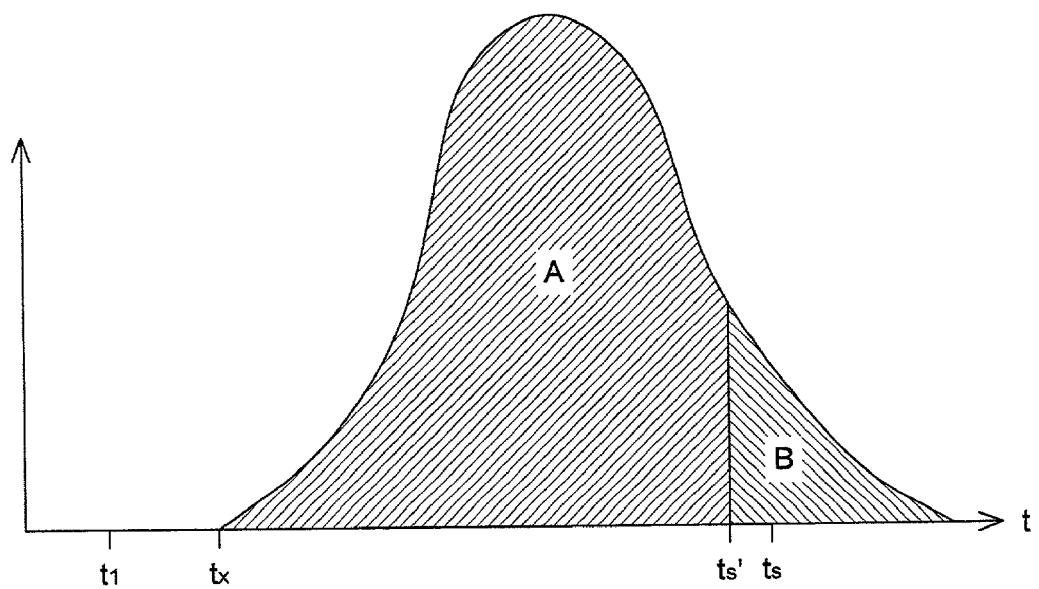
FIG. 16 shows a graph of a strobe-light emission characteristic of a strobe device, when the value of (subject distance)×(aperture value) is large.

FIG. 15 shows a graph of a strobe-light emission characteristic of the strobe device, when the value of (subject distance)×(aperture value) is small, and FIG. 16 shows a graph of a strobe-light emission characteristic of the strobe device, when the value of (subject distance)×(aperture value) is large. As stated above, since only a small amount of the strobe light is required when the value of (subject distance)×(aperture value) is small, an area of region A becomes small as shown in FIG. 15. On the contrary, since a large amount of the strobe light is required when the value of (subject distance)×(aperture value) is large, an area of region A becomes large as shown in FIG. 16.

Employing the abovementioned method, since the value of (ts'−tx) is estimated in advance, it becomes possible to shorten the value of (ts–ts') and to decrease the error smaller than that in the aforementioned example, even if the shutter opening second-time is a short time in the mode of the day-time synchronous strobe lighting. Accordingly, the day-time synchronous strobe lighting can be performed in a higher speed than ever. When time ts' happens after time ts, of course, time ts initially established is ignored, and the integrating operation performed in the solid-state imager continues until time ts' happens, namely, until the stop-command signal is outputted. However, although not shown in the drawing, when the stop-command signal cannot be outputted due to a lack of an emission amount of the strobe light, the electronic charges stored in circuit cells of the imager are swept out at either time ts or time ts', namely, the shutter is closed. Further, it is also applicable that the electronic charges stored in circuit cells of the imager are forcibly transferred, at the shutter opening second-time (for instance, 1/60), as a time limit for preventing shake-blurring, after a time far longer than time ts or time ts' has elapsed, or at the slowest shutter opening second-time (for instance, 1/8), to finalize the exposing operation.

Figure 17:
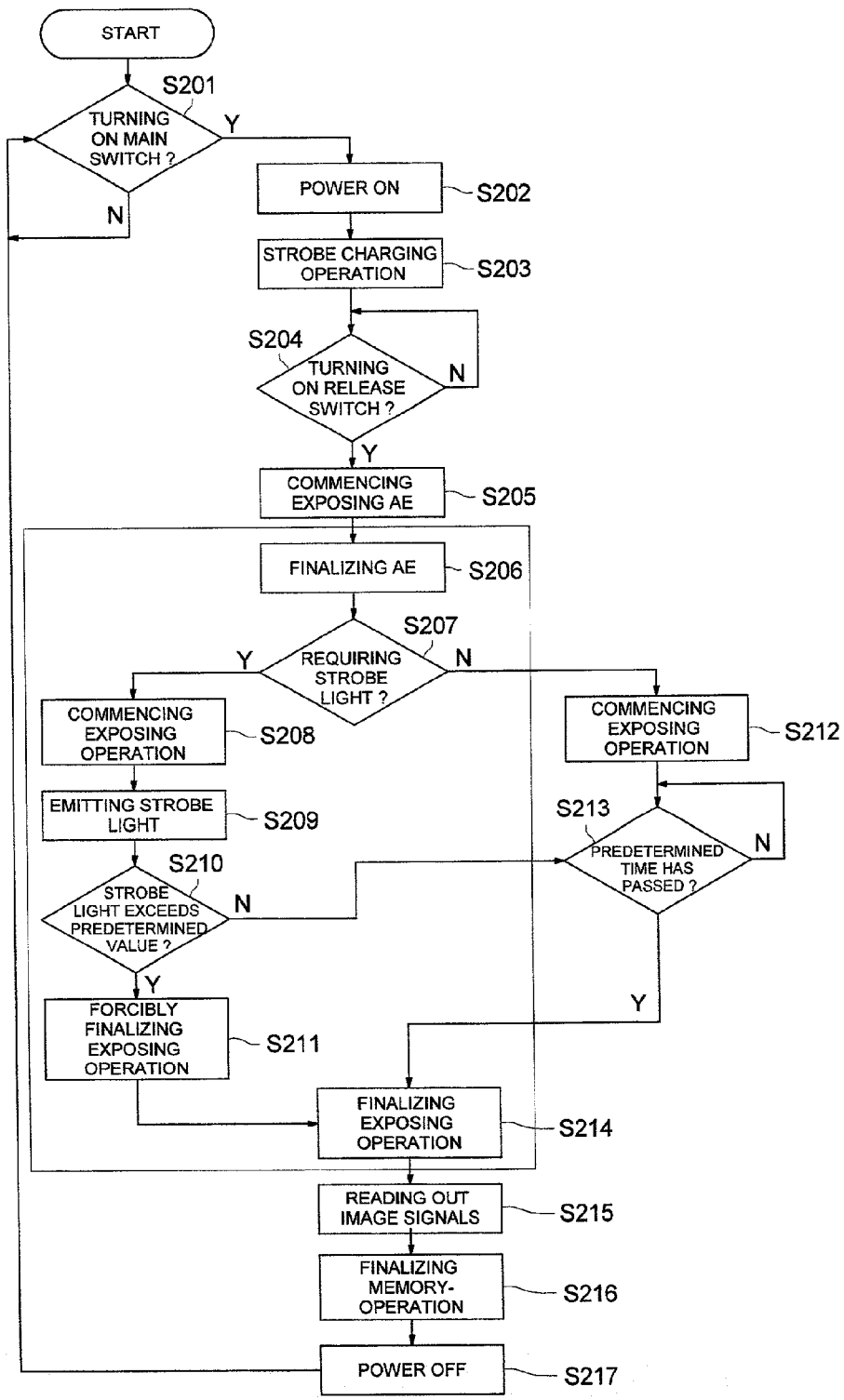
FIG. 17 shows a flowchart for controlling image-capturing operations of an electronic still camera, serving as a fourth embodiment of the present invention.

FIG. 17 shows a flowchart for controlling image-capturing operations of an electronic still camera, serving as a fourth embodiment of the present invention.

The flowchart shown in FIG. 17 comprises the steps of: S201, determining whether or not the photographer turns ON the main switch; S202, supplying the electronic power to each of the sections when determining that the photographer turns ON the main switch in step S201; S203, charging a main capacitor (not shown in the drawings) mounted in strobe circuit 200, wherein the charging operation would be performed only at times as needed; S204, determining whether or not the photographer pushes the release switch; S205, in which MPU 27 commences the exposing operation with the signals outputted from second group circuit cells 50b (or first group circuit cells 50a or both of them) when determining that the photographer pushes the release switch in step S204; S206, completing the exposing operation; and S207, determining whether or not the strobe lighting operation should be performed.

Although various kinds of exposure controlling methods would be available at present, it is possible to determine an optimum exposure condition on the basis of data continuously read out from second group circuit cells 50b.

The flowchart shown in FIG. 17 further comprises the steps of: S208, in which MPU 27 commences the exposing operation when determining that the strobe lighting operation should be performed due to the low brightness of the subject; and S209, sending the trigger pulse to strobe circuit 200 to emit the strobe light from strobe 2.

After the commencement of the exposing operation or immediately before the emission of the strobe light, the operation for reading out signals from second group circuit cells 50b is commenced, in which the signals are read out and verified at every period of the clock signals. Each of second group circuit cells 50b uses the image signal as it is, and the signals from the circuit cells are simultaneously read out at every period of the clock signals, namely, the signals outputted from the circuit cells are summed and read out. To commence the reading out operation before the emission of the strobe light is equivalent to the fact that the operation for resetting each of the circuit cells is conducted before the emission of the strobe light.

The flowchart shown in FIG. 17 further comprises the steps of: S210, determining whether or not an amount of the emitted strobe light exceeds the predetermined value, based on the signals outputted from second group circuit cells 50b; S211, in which MPU 27 sends a stop-command signal to strobe circuit 200 so as to forcibly deactivates the emitting action of the strobe light, or to finalize the exposing operation (stoppage of storing the electronic charges in first group circuit cells 50a, or stoppage of discharging the electronic charges stored in them); S213, in which MPU 27 is waiting until a predetermined exposing time has passed when not in step S210; S214, finalizing the exposing operation; S212, in which MPU 27 commences the exposing operation without emitting the strobe light when not in step S207 and finalizing the exposing operation in step S214; S215, reading out image signals from first group circuit cells 50a; S216, converting the image signals to image data and storing the image data into a memory (not shown in the drawings); and S217, tuning OFF the power supply as needed.

Supplemental explanations for the abovementioned controlling operation will be described in the following.

After the emission of the strobe light, the signals read from second group circuit cells 50b are integrated one by one at every period of the clock signals, wherein the reading action is triggered by the emission of the strobe light. Then, comparator 7 compares the integrated value with the threshold value (the light-adjusting level) established in advance, and outputs the stop-command signal to imager controlling circuit 23, which closes the electronic shutter of CMOS imager 22 in response to the stop-command signal so as to finalize the exposing operation.

As a method for reading out the signals, it is also applicable that the signals are read out through signal lines directly coupled to the circuit cells, which are once reset and cleared, instead of reading out one by one at every period of the clock signals. In this case, the strobe light is integrated in each of the circuit cells, and it is desirable that comparator 7 compares a value of summing the signals outputted by each of the circuit cells. Further, it is also possible that second group circuit cells 50b are selected depending on cases, which will be detailed later, referring to FIG. 18. For instance, when the circuit cells receiving light coming from a high luminance subject are selected as second group circuit cells 50b, sometimes, the light intensity of the subject could not be ignored, compared to the intensity of the strobe light. There would be a possibility that applying the output signals of such the circuit cells for the light-intensity controlling operation would cause an error in detecting the light amount of the strobe light. To avoid this, second group circuit cells 50b are scanned to detect whether or not each of the circuit cells receives light coming from a high luminance subject, and the detected circuit cells, which receive the light coming from a high luminance subject, are excluded from the usable photo-sensing elements. However, since strobe 2 emits the strobe light having relatively high-luminous intensity within a short time, the influence of the normal light in the field within the light-emitting time of strobe 2 would be possibly ignored, and the abovementioned operation for selecting the circuit cells could be omitted in such the case.

In the forth embodiment, when the output level of second group circuit cells 50b reaches to the light-adjusting level established in advance, comparator 7 outputs the stop-command signal to imager controlling circuit 23, so as to finalize the exposing operation. It is also possible to integrate the circuit having the abovementioned function into CMOS imager 22. It is applicable that the light-adjusting level, etc. are set by external operations of the photographer.

When circuit cells included in a color imager having B-G-R filters are utilized as second group circuit cells 50b, there are a method of employing some circuit cells included in color G (Green) as second group circuit cells 50b and another method of employing some circuit cells, selected from each of B-G-R groups of the circuit cells in a good balance, as second group circuit cells 50b. Alternatively, it is also possible that either another color filter, other than B-G-R filters, or no color filter is covered on second group circuit cells 50b.

Figure 18:
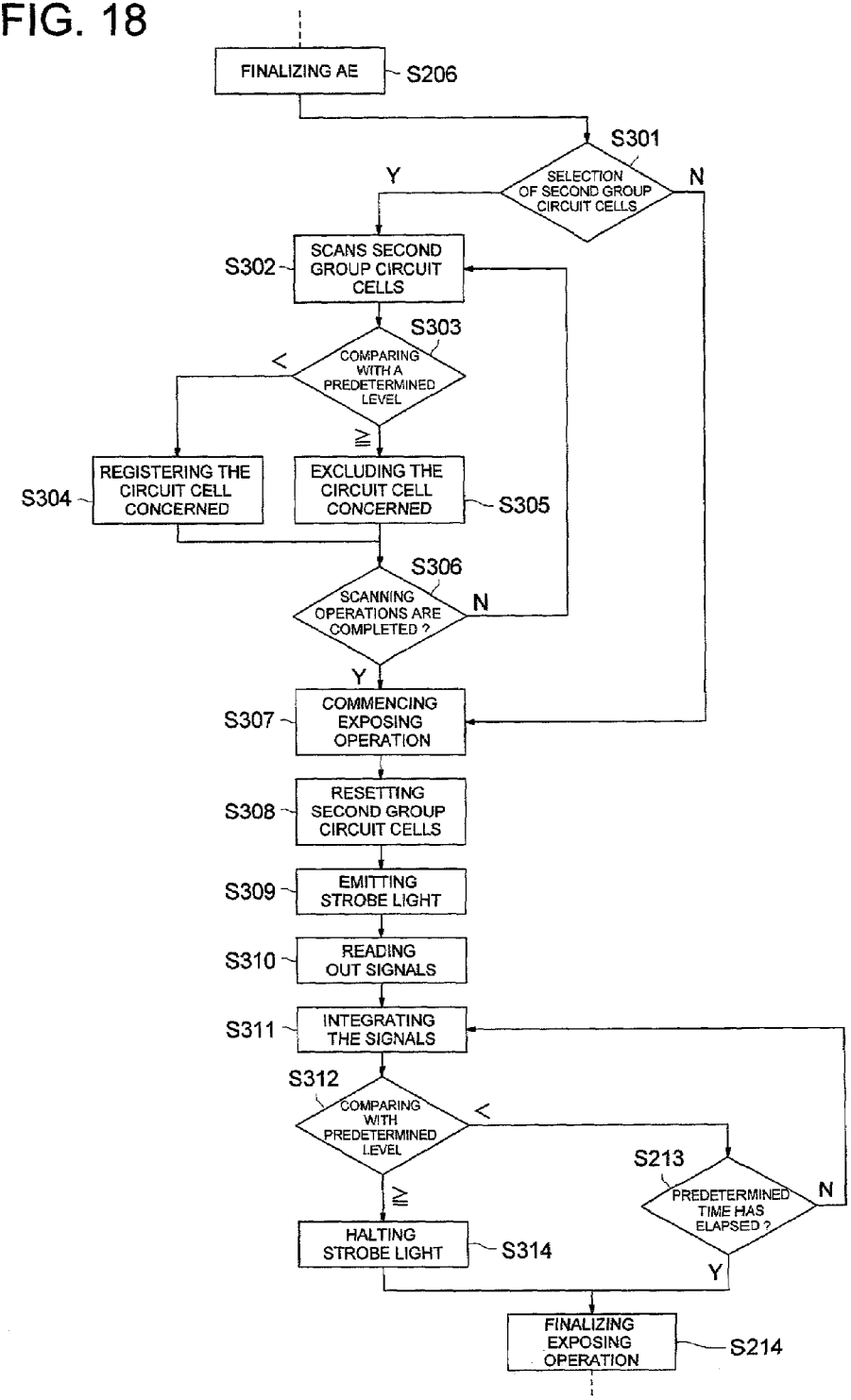
FIG. 18 shows a flowchart for detailing an image-capturing operation, with respect to a modified example of a strobe exposure controlling operation shown in FIG. 17.

FIG. 18 shows a flowchart for detailing an image-capturing operation, with respect to a modified example of the strobe exposure controlling operation shown in FIG. 17. This modified example indicates the controlling method to be performed when light coming form the high-luminance subject, such as a light-emitting object, for instance, like a headlight, etc., enter into second group circuit cells 50b.

The flowchart shown in FIG. 18 comprises the steps of: S206 (same as S206 shown in FIG. 17), completing the exposing operation; S301, determining whether or not selection of second group circuit cells 50b, which receive the light from the high-luminance subject, is required, based on a mode established in advance by the photographer; S302, in which MPU 27 scans second group circuit cells 50b in a high-speed to examine each of output signals of the circuit cells when determining that the selecting-operation is required in step S301; S303, comparing each of the output signals with a predetermined level (threshold value), wherein MPU 27 determine that the circuit cell concerned receives the light from the high-luminance subject when its output signal level is higher than the predetermined level (threshold value), while MPU 27 determine that the circuit cell concerned does not receives the light from the high-luminance subject when its output signal level is lower than the predetermined level (threshold value); S304, registering the circuit cell concerned when determining that it does not receives the light from the high-luminance subject; and S305, excluding the circuit cell concerned when determining that it receives the light from the high-luminance subject. Although the threshold value could be a fixed value, it would be also applicable that an average value of more than three signal values of circuit cells is calculated, and circuit cells, the signal values of which are far different from the average value, are excluded.

The flowchart shown in FIG. 18 further comprises the steps of: S306, determining whether or not all of the scanning operations are completed; S307, commencing the exposing operation when determining that all of the scanning operations are completed in step S306 or when not in step S301; S308, resetting second group circuit cells 50b; S309, emitting the strobe light from strobe 2 driven by strobe circuit 200 in response to the trigger-pulse; S310, reading out the signals outputted from second group circuit cells 50b; S311, integrating the signals into the integrated value; S312, comparing the integrated value with the predetermined level (threshold value); S314, halting the emitting action of the strobe light when determining that the integrated value exceeds the predetermined level in step S312; S313, waiting until the predetermined time has elapsed when determining that the integrated value does not exceed the predetermined level in step S312; and S214 (same as S214 shown in FIG. 17), finalizing the exposing operation (stoppage of storing the electronic charges in first group circuit cells 50a, or stoppage of discharging the electronic charges stored in them).

In the embodiments mentioned above, first group circuit cells 50a for obtaining the image data and second group circuit cells 50b for obtaining the exposure controlling data are independent relative to each other. However, in case that second group circuit cells 50b are nondestructive readout memories, it is possible to confirm an amount of electronic charge stored in each circuit cell without erasing the electronic charge, and therefore, it becomes possible to utilize the electronic charges stored in second group circuit cells 50b for a part of the image data, resulting in an improvement of the image quality. Further, the integrating operation could be commenced when the electronic charges stored in second group circuit cells 50b are in a state of outputting after the electronic charges are discharged.

As described in the above, since it is possible to readout an electronic charge stored in arbitral circuit cell when the CMOS imager is employed, a part of the circuit cells included in the CMOS imager can be utilized for obtaining the exposure controlling data, and accordingly, the conventional photo-detecting element for measuring a field brightness can be excluded from the electronic still camera, resulting in a cost-reduction of the camera and an improvement of design flexibility for the outlook of the camera.

Figure 19:
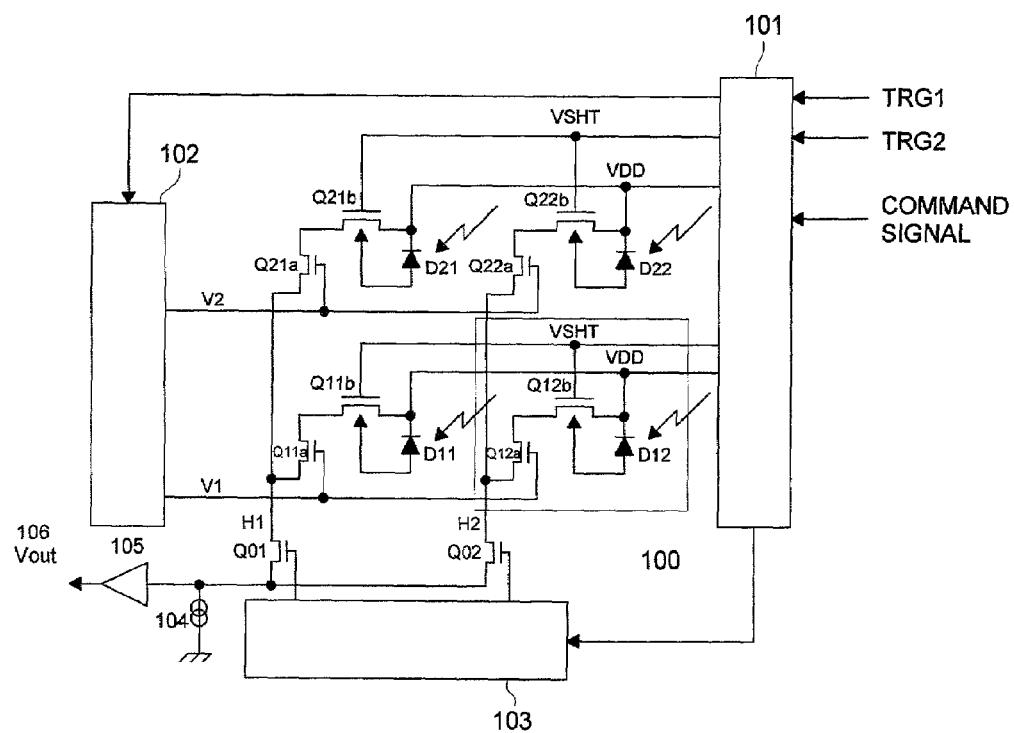
FIG. 19 shows a circuit diagram of the CMOS imager embodied in the present invention.

Next, referring to FIG. 19 and FIG. 20, another embodiment of the CMOS imager will be detailed in the following. FIG. 19 shows a circuit diagram of the CMOS imager embodied in the present invention. As shown in FIG. 19, in the CMOS imager, the configuration of which is a two-dimensional arrayed sensor, the aforementioned circuit cells, corresponding to pixels of the image, are aligned in both the column direction and the line direction so as to constitute a matrix pattern.

Further, vertical shift register 102, serving as a generator for generating vertical scanning signals (VSCAN), is disposed at a left side of an area of the circuit cells. Vertical-scanning signal lines v1, v2, which are extended from vertical shift register 102 corresponding to every line, are coupled to the gates of MOS transistors Qxxa included in circuit cells 100 aligned in both the column direction and the line direction.

Still further, horizontal shift register 103, serving as a generator for generating horizontal scanning signals (HSCAN), is disposed at a lower side of an area of the circuit cells. Vertical-outputting lines h1, h2, which are different each other corresponding to every column, are coupled to the sources of MOS transistors Qxxa included in circuit cells 100 aligned in both the column direction and the line direction. Each of vertical-outputting lines h1, h2 is further coupled to each of the drains of MOS transistors Q01, Q02, serving as a switching element for every column. The gates of MOS transistors Q01, Q02 are further coupled to horizontal shift register 103, serving as a generator for generating horizontal scanning signals (HSCAN).

Still further, timing-signal generator 101, serving as a generating circuit for generating a shutter signal (VSHT) and a drain voltage (VDD), is disposed at a right side of an area of the circuit cells. The drains of all MOS transistors included in circuit cells 100 aligned two-dimensionally are coupled to the drain voltage supplying lines, which are extended from timing-signal generator 101, serving as a generating circuit for generating a drain voltage (VDD). The gates of all MOS transistors included in circuit cells 100 aligned two-dimensionally are coupled to the shutter signal supplying lines, which are extended from timing-signal generator 101, serving as a generating circuit for generating a shutter signal (VSHT).

Still further, the sources of switching MOS transistors Q01, Q02, are coupled to amplifier 105 through a common constant current source 104, and further, the output voltage of amplifier 105 is coupled to output port 106. Concretely speaking, the sources of MOS transistors Qxxb included in circuit cells 100 are coupled to constant current source 104 through MOS transistors Qxxa and switching MOS transistors Q01, Q02 so as to constitute source follower circuits, each of which corresponds to each of the pixels. Accordingly, the potential difference between the gate and the source, and the potential difference between the bulk and the source are determined depending on the property of constant current source 104, serving as a loading circuit.

Vertical scanning signals (VSCAN) and horizontal scanning signals (HSCAN) sequentially drive each of MOS transistors Qxxb included in each of the circuit cells, corresponding to each pixels of the image, so as to read out the image-signals (VOUT), which are in proportion to the amounts of entered light. As aforementioned, since photodiode Dxx and MOS transistors Qxxb, Qxxa constitute each of circuit cells, the CMOS manufacturing technology can be applied for fabricating each of circuit cells on the imager. Accordingly, the circuit cells can be fabricated on the same solid-state semi-conductive substrate on which peripheral circuits, such as timing-signal generator 101, vertical shift register 102, horizontal shift register 103, constant current source 104, etc., are also fabricated.

The feature of the configuration of the abovementioned imager is lies on the point that the exposing operations for all of the circuit cells can be simultaneously commenced and completed at a time in a similar manner as that in the progressive scanning-type CCD imager. The above feature is very effective for performing an exposure controlling operation when a light source, having a very short duration time of illumination, such as a strobe, is employed. In the conventional CMOS imager, the electronic charges stored in the circuit cells are sequentially read out one by one or in a unit of one line. Although there is no problem for the conventional CMOS imager to be exposed under a normal field condition, the exposing conditions should be restricted when the exposing operation is performed with a light source, having a very short duration time of illumination, such as the strobe. In other words, the emission of the strobe light should be commenced and finalized within a time interval of the exposing operation. It is impossible for the conventional CMOS imager to halt transferring the electronic charges in order to finalize the exposing operation, in the manner as performed in the CMOS imager embodied in the present invention.

FIG. 20 shows a timing chart of signals for operating the CMOS imager shown in FIG. 19 in which photodiode D11 is utilized for the second group circuit cell. The timing chart is applied for the CMOS imager in which p-type well region is employed and MOS transistors Qxxb for detecting optical signals are nMOS. In the CMOS imager, it is possible to perform repeated operations, for instance, in such a sequence of "sweeping out period (initializing period)"—"storing period (exposing period)"—"reading out period"—"sweeping out period (initializing period)"-•••••-.

The operations performed in the abovementioned configuration of the CMOS imager will be detailed in the following. Four voltage values of 0V (0 volt), VL (for instance, 1 volt), VM (for instance, about 3 volt) and VM (for instance, about 5 volt) are established in advance. In the sweeping out period, the electronic charges stored in photodiode Dxx and a carrier pocket under the gate of MOS transistors Qxxb can be swept out by adding VH to VDD and VSH (at t0). After completion of the initializing operation, by changing VDD to VM and VSH to VL (at t1), an electronic charge is generated in response to an amount of light entered into the photodiode, and then, the generated electronic charge flows into the carrier pocket formed under the gate of the MOS transistor. At this time, the exposing operation is commenced, and the strobe emits the strobe light at a later time point of the exposing period (at t3). At time t2 slightly earlier than time t3, the reading out operation for reading out signals from D11 is commenced, and signals are integrated one by one while sequentially reading out the signals at a constant time interval from photodiode D11 by using vertical-outputting line h1. When the integrated value reaches to a threshold value, namely, the amount of the strobe light reaches to an optimum value, the exposing operation is finalized by changing VSH from VL to VM (at t4). Accordingly, the actions of flowing the electronic charges from photodiodes Dxx into the carrier pockets formed under the gates of MOS transistors Qxxb are deactivated to finalize the exposing operation. Then, the reading out operation driven by vertical shift register 102 and horizontal shift register 103 is commenced. For instance, a signal can be read out from MOS transistor Q11*b* by changing H1 and V1 from 0V to H (at t5). In the same manner, all of signals can be read out from MOS transistors Qxxb by changing each of all combinations of Hx and Vx from 0V to H. After all of the signals are read out, the initializing operation is performed by changing again VDD and VSH to VH, so as to stand by the next exposing operation. Then, after a constant time has elapsed or after the action of emitting the strobe light has been completed, the signals are read out from each of the circuit cells, corresponding to the pixels of the image. Since the signals from the circuit cells including photodiodes Dxx are already read out, a little amount of electronic charges remains.

In the abovementioned embodiment, the CMOS imager, having four circuit cells in which one circuit cell is utilized for the purpose of the photometry operation, is exemplified. Even if a number of the circuit cells included in the CMOS imager increases, the operations for such the expanded configuration are fundamentally the same as the above. However, since plural circuit cells are employed as the second group circuit cells, addresses for tuning ON the MOS transistors included in the circuit cells should be established so that the signals can be read out from the circuit cells at a time. The signals are summed to output a summed signal. There would be a case, however, that the amplitude of the summed signal increases too large to the extent that the amplitude of the summed signal exceeds the dynamic-range of the output amplifier. To avoid this, each of the signals of the second group circuit cells can be read out one by one with the clock signals faster than ever, or the second group circuit cells are divided into several groups, and the divided group of the signals can be read out one by one. The output signals are summed and integrated at the out side of the imager. Since the fundamental configuration of the CMOS imager mentioned above is already set forth in, for instance, Tokkaihei 11-195778, the details of it will be omitted in the following.

Although the embodiments of the present invention are detailed in the above, it is needless to say that the scope of the present invention is not limited to the abovementioned embodiments, and each of the embodiments could be modified or improved into an appropriate configuration by a skilled person. For instance, the present invention can be utilized not only for the strobe light adjusting operation, but also in all fields of the exposure controlling operation. Further, the present invention can be applied not only for electronic still cameras, but also for various kinds of image-capturing apparatus, such as radiation image capturing apparatus, etc.

Further, it would be applicable that, with respect to the color imager having G-B-R filters, the circuit cells, covered with the G filter (Green filter), are also utilized as second group circuit cells to obtain the exposure controlling data.

Still further, it is also possible that, for instance, the second group circuit cells are selected out of the circuit cells located at the central area of the image-capturing section when performing a photometry weighted center portion, while the second group circuit cells are selected out of the circuit cells located at the whole area of the image-capturing section when performing a averaging photometry, without fixing the position of the second group circuit cells.

Still further, it is applicable that the ports for obtaining image data also serves as ports for obtaining the exposure controlling data, and an output port of integrated amount of the strobe light is separately equipped. It is also possible that, when scanning the second group circuit cells to read the signals, the second group circuit cells are divided into several groups so as to read the signals group by group from them. For instance, since an important subject is apt to be located at the central area of the whole image, the signals would be read out, starting from the central area, every column or every line, or in a spiral reading mode.

Still further, it is possible that two memories (two electronic charge storing sections) are provided in one circuit cell, to store the electronic charge for the image in one of the two memories before emitting the strobe light and to store the electronic charge for the image in another one of the two memories after emitting the strobe light. According to this configuration, it becomes possible to obtain the image data before emitting the strobe light without any hurt. An optimum exposure amount is estimated in advance for controlling the time of emitting the strobe light. Accordingly, the strobe light can be activated at the time earlier than the exposure-finalizing time in proportion to the estimated optimum exposure amount.

According to the image-processing system embodied in the present invention, it becomes possible to provide an image-capturing apparatus and an imager employed for it, which is low-cost, flexible in outlook designing and possible to accurately adjust the light amount by reducing a number of necessary parts and adjusting man-hours.

Disclosed embodiment can be varied by a skilled person without departing from the spirit and scope of the invention.

What is claimed is:

1. An apparatus for capturing an image of an object, comprising:

a controller to control an image forming operation of the apparatus;

a first addressing circuit communicating with the controller for designating a first address;

a second addressing circuit communicating with the controller for designating a second address;

a switch communicating with the controller for outputting an image capturing start signal; and an imager having a plurality of circuit cells two-dimensionally arranged within an image area where the image is projected, the plurality of circuit cells respectively corresponding to pixels of the image;

wherein each of the plurality of circuit cells comprises:

a photoelectric converting element to generate charges associated with an amount of light from the object;

a charge storing element to store charges transferred from the photoelectric converting element; and a MOS transistor, including a drain that is electrically connected to the charge storing element, a gate that is controlled by the first addressing circuit, and a source that is controlled by the second addressing circuit;

wherein the circuit cells are arbitrarily selectable as one of an arbitrary single circuit cell and an arbitrary group of circuit cells by the controller by designating one of a single address and a group of addresses at a time via the first and second addressing circuits, so as to discharge charges from one of a selected single charge storing element and a selected group of charge storing elements;

wherein the plurality of circuit cells are divided into: (i) first group circuit cells to capture the image of the object, and (ii) second group circuit cells, which are substantially uniformly disposed in the first group circuit cells in the image area, to measure an amount of light from the object for a photometry operation; and wherein the controller controls the first group circuit cells and the second group circuit cells to simultaneously commence respective photoelectric converting actions in response to the image-capturing start signal, wherein the controller measures a signal value of at least one circuit cell selected by the controller in the second group circuit cells while the first group circuit cells are performing the photoelectric converting action, and wherein the controller stops the photoelectric converting action of the first group circuit cells when the signal value reaches a predetermined value.

2. The apparatus of claim 1, wherein said switch comprises one of a release switch and a power switch.

3. The apparatus of claim 1, further comprising:
a warning section to issue a warning, if said signal value does not reach to said predetermined value when a predetermined time has elapsed since the photoelectric converting action of the first group circuit cells was commenced.

4. The apparatus of claim 1, wherein, if said signal value does not reach to said predetermined value when a predetermined time has elapsed since the photoelectric converting action of the first group circuit cells was commenced, said photoelectric converting action performed by said first group circuit cells is finalized.

5. The apparatus of claim 1, wherein, if said signal value does not reach said predetermined value when a predetermined time has elapsed since the photoelectric converting action of the first arouo circuit cells was commenced, whether or not to continue said photoelectric converting action performed by said first group circuit cells is determined in response to a predetermined operation.

6. The apparatus of claim 5, further comprising:
a mode selecting device to select one of a first mode in which said photoelectric converting action performed by said first group circuit cells is continued in response to said predetermined operation, and a second mode in which said first first group circuit cells perform an action other than continuing said photoelectric converting action in response to said predetermined operation.

7. The apparatus of claim 5, wherein, said predetermined operation is to operate said switch.

8. The apparatus of claim 1, further comprising:
an aperture device, disposed between said object and said if imager, to vary a diameter of an aperture opening;
wherein, if said signal value does not reach said predetermined value when a predetermined time has elapsed since said photoelectric converting action by the first group circuit cells was commenced, said aperture device increases said diameter of said aperture opening.

9. The apparatus of claim 8, wherein said aperture device varies said diameter of said aperture opening in a non-stop mode.

10. The apparatus of claim 8, wherein said aperture device varies said diameter of said aperture opening in a stepwise mode.

* * * * *